(12) United States Patent
Nogami et al.

(10) Patent No.: US 8,553,049 B2
(45) Date of Patent: Oct. 8, 2013

(54) INFORMATION-PROCESSING APPARATUS AND INFORMATION-PROCESSING METHOD

(75) Inventors: Atsushi Nogami, Tokyo (JP); Naoki Nishimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 621 days.

(21) Appl. No.: 12/207,322

(22) Filed: Sep. 9, 2008

(65) Prior Publication Data

US 2009/0066725 A1    Mar. 12, 2009

(30) Foreign Application Priority Data

Sep. 10, 2007  (JP) ................. 2007-234713

(51) Int. Cl.
*G09G 5/00*         (2006.01)
*G06F 3/041*        (2006.01)

(52) U.S. Cl.
USPC ............... 345/632; 345/633; 345/419; 345/7; 345/8; 345/9; 345/173

(58) Field of Classification Search
USPC ................. 345/419, 632–633, 156, 7–9, 629, 345/420, 173
See application file for complete search history.

(56) References Cited

U.S. PATENT DOCUMENTS

| | | | | |
|---|---|---|---|---|
| 5,999,185 A * | 12/1999 | Kato et al. | ..................... | 345/420 |
| 6,088,017 A | 7/2000 | Tremblay | | |
| 6,409,599 B1 * | 6/2002 | Sprout et al. | ..................... | 463/31 |
| 6,951,515 B2 * | 10/2005 | Ohshima et al. | ................. | 463/31 |
| 7,589,747 B2 * | 9/2009 | Matsui et al. | ..................... | 345/7 |
| 2004/0095311 A1 * | 5/2004 | Tarlton et al. | ................. | 345/156 |
| 2007/0085820 A1 * | 4/2007 | Suzuki et al. | ................. | 345/156 |
| 2008/0024392 A1 * | 1/2008 | Gustafsson et al. | ............... | 345/8 |
| 2008/0100588 A1 * | 5/2008 | Nogami et al. | ............... | 345/173 |
| 2009/0256800 A1 * | 10/2009 | Kaufman | ....................... | 345/156 |
| 2010/0110384 A1 * | 5/2010 | Maekawa | ......................... | 353/10 |
| 2011/0187706 A1 * | 8/2011 | Vesely et al. | .................. | 345/419 |
| 2012/0086631 A1 * | 4/2012 | Osman et al. | .................. | 345/156 |

FOREIGN PATENT DOCUMENTS

| | | |
|---|---|---|
| JP | 8069449 A | 3/1996 |
| JP | 9120464 A | 5/1997 |
| JP | 2001229408 A | 8/2001 |
| JP | 2003-316493 A | 11/2003 |
| JP | 2004318399 A | 11/2004 |
| WO | 97/20305 A1 | 6/1997 |
| WO | 97-20305 A1 | 6/1997 |
| WO | 2007/100204 A1 | 9/2007 |

OTHER PUBLICATIONS

Hiroaki Yano, Tetsuro Ogi, Michitaka Hirose: "Development of Haptic Suit for Whole Human Body Using Vibrators", 1998, vol. 3, No. 3.

(Continued)

*Primary Examiner* — Chante Harrison
(74) *Attorney, Agent, or Firm* — Canon U.S.A., Inc. IP Division

(57) ABSTRACT

An information-processing apparatus determines whether a stimulation generation unit and a background virtual object contact each other based on position and orientation information about the stimulation generation unit and position and orientation information about the background virtual object. If it is determined that the stimulation generation unit and the background virtual object contact each other, the information-processing apparatus determines whether the stimulation generation unit is included within an attention range. The information-processing apparatus generates operation setting information for controlling an operation of the stimulation generation unit according to a result of the determination and outputs the generated operation setting information to the stimulation generation unit.

16 Claims, 13 Drawing Sheets

(56) References Cited

OTHER PUBLICATIONS

Jonghyun Ryu, Gerard Jounghyun Kim: Using a Vibro-tactile Display for Enhanced Collision Perception and Presence, 2002.

Tanriverdi et al., "Interacting With Eye Movements in Virtual Environments", CHI 2000, Apr. 2000, pp. 265-272.

Buchmann et al., "FingARtips-Gesture Based Direct Manipulation in Augmented Reality", Virtual Reality 2004; vol. 1, Issue 212, pp. 212-221, Publisher: ACM.

* cited by examiner

INFORMATION-PROCESSING APPARATUS AND INFORMATION-PROCESSING METHOD

BACKGROUND OF THE INVENTION

1. Field of the Invention

The present invention relates to an information-processing apparatus configured to implement an interaction between a virtual space and a user who observes the virtual space and to an information-processing method therefor.

2. Description of the Related Art

As is publicly known, a virtual reality system (VR system) refers to a system that performs the following operations. That is, the VR system configures a virtual space using three-dimensional computer graphics (CG) and displays an image in the virtual space on a large-sized display, a mobile apparatus display, or a head-mounted display (HMD). Thus, the VR system can cause a user to feel as if the virtual space is a real space.

In addition, a mixed reality system (MR system) has been developed for superposedly displaying a virtual object generated using three-dimensional CG on an image in a real space. The MR system uses an image in a real space to allow a user to more easily enjoy a sense of actual size than that offered in a conventional VR system. In the case of using an HMD in such a conventional system, a user can feel a greater sense of immersion into a virtual space because the virtual space is displayed according to a viewpoint of the user and a direction of a line of sight (visual axis) of the user.

Meanwhile, in recent years, a method of designing a product using a three-dimensional computer-aided design (3D-CAD) technique has become the mainstream in the field of product design and manufacture. In this regard, as a method for evaluating an object that has been designed with 3D-CAD, a method is generally used for visually evaluating data generated with 3D-CAD and displayed on a screen of a computer as a 3D-CG image.

In addition, a method is also generally used for evaluating a simplified prototype (simplified mock-up) manufactured with a rapid prototyping apparatus and evaluating the prototype based on a tactile sense. However, in the case of evaluating an automobile or a large-sized apparatus with a conventional method, it is not easy to perform a close evaluation because a sense of actual size cannot be obtained on a screen of a computer.

Furthermore, in the case of manufacturing a simplified mock-up, if the size of the mock-up to be manufactured is large, the cost of manufacture may become high. In this regard, a conventional method allows a user to evaluate a product under an environment in which the user can feel a sense of actual size or immersion by displaying CG information with 3D-CAD using the VR system or the MR system.

Thus, the user can more intuitively evaluate or verify a product by looking at a virtual object with an actual size.

In the case of evaluating an operability or assemblability of an object to be designed, not only visual information provided as CG information but also tactile sense information obtained at the time of touching an object are required.

In the case of performing an evaluation of a product to be designed using a mock-up, the user can actually touch and verify the mock-up. However, in order to obtain tactile sense information in the case of using a VR system or an MR system, it is necessary to user a specific apparatus, device, or method.

That is, in order to express a feel of a virtual object expressed with CG information, it is necessary to use a device that performs contact detection processing for detecting a contact of a user with a virtual object and expresses and provides tactile sense information to the user.

A device that expresses tactile sense information is generally called a "haptic device" or a "haptic display". Such a "haptic device" or a "haptic display" includes a force feedback providing apparatus that expresses a reaction from a virtual object and a cutaneous sense providing apparatus (tactile display) that provides a stimulation to a cutaneous sense of a user.

It is useful to express a reaction from an object using a force feedback providing apparatus to evaluate and verify a product (object) to be designed. However, a conventional force feedback providing apparatus is generally large-sized and thus cannot be easily transported. Accordingly, in the case of virtually evaluating an automobile or a large-sized apparatus, an available scope of evaluating an object to be designed may be restricted because of the poor portability of the force feedback providing apparatus. Thus, in this case, it may become difficult for the user to intuitively perform the necessary evaluation operation.

Furthermore, in the case of using a force feedback providing apparatus over a large area, it is difficult for the user to feel a sense of immersion over the user's body by a tactile sense because only one force point is available to express a feel of the object in most cases. Accordingly, the scope or area of a virtual object available for verification with a tactile sense may be restricted even in the case where the virtual object to be designed is expressed in a VR system or an MR system that can provide a sense of an actual size. Thus, an effect of evaluating an object to be designed with a virtual object of an actual size may be reduced.

On the other hand, in the case of using a small-sized cutaneous sense providing apparatus whose portability is high, the tactile sense can be expressed with a greater sense of immersion by mounting the small-sized cutaneous sense providing apparatus at a plurality of regions of the user's body.

In this regard, as a highly portable cutaneous sense providing apparatus, Patent Cooperation Treaty (PCT) Japanese Translation Patent Application Laid-Open No. 2000-501033 discusses a device that provides a vibration stimulation to a user via a vibration motor mounted at a finger portion of a glove that the user wears according to user's contact with a virtual object.

Furthermore, Japanese Patent Application Laid-Open No. 2003-316493 discusses a method for providing a user with a skin stimulation to the front surface of a finger of a user according to user's contact with a virtual object by using a mechanism for providing a stimulation by pressing against the front surface of the finger of the user, which is disposed at a finger front surface portion of a glove. In the case of expressing a tactile sense using a vibration motor, whether the virtual object has been contacting a region of the user can be expressed although it is difficult to express a reaction force from the virtual object.

Furthermore, such a vibration motor is small-sized, lightweight, and relatively inexpensive, and can generate a stimulation intense enough to cause a user to recognize vibration. Accordingly, a conventional method implements a tactile sense presentation with a greater sense of immersion by using a plurality of vibration motors mounted on the whole body of a user including regions such as fingers or palms.

For example, "Hiroaki Yano, Tetsuro Ogi, Michitaka Hirose: Development of Haptic Suit for Whole Human Body Using Vibrators", Journal of Virtual Reality Society of Japan, Vol. 3, No. 3, 1998 discusses a device that allows a user wearing twelve vibration motors to recognize a virtual wall at the time of contacting the virtual wall. In the case of using the device discussed therein, twelve vibration motors are mounted on human body regions at the head, the backs of the hand, the elbows, regions around the waist (three pieces), knees, and ankles. The positions of mounting the vibration motors are determined based on a human perception diagram.

Furthermore, "Jonghyun Ryu, Gerard Jounghyun Kim: "Using a Vibro-tactile Display for Enhanced Collision Perception and Presence", VRST '04, Nov. 10-12, 2004, Hong Kong" discusses a method in which vibration motors are mounted on the body of a user at four positions on the arms and legs, respectively, to provide different information indicating virtual contacts with objects of different feels by varying the vibration of the vibration motors.

Meanwhile, a user may consciously or unconsciously contact a virtual object. In the case of conscious contact, the user can easily recognize the contact even if the intensity of the stimulation provided by a vibration motor is low. On the other hand, in the case of unconscious contact, the user may not even recognize the stimulation provided by a vibration motor if the intensity of the stimulation on a region that has unconsciously contacted the virtual object is not high enough. In particular, in order to express contact of a virtual object on the whole body of a user, the expression of the contact is performed with respect to many regions of the body of the user. Accordingly, in this case, it is difficult for the user to always recognize contact with a virtual object for the whole body.

In this regard, if the user performs an operation with the hands, the user may particularly aware of the hands and thus becomes less aware of the legs. Accordingly, even if a stimulation is provided with respect to contact with a virtual object by the legs, the user may not positively recognize the stimulation.

On the other hand, if the intensity of stimulation is uniformly increased regardless of whether the user is aware of contact so that the user surely receives the provided stimulation information from any position of contact of the user's body with a virtual object, the intensity of stimulation may become very high in the case where the user consciously contacts the virtual object, and thus the user may feel uncomfortable with the excessive stimulation.

As described above, the conventional method cannot solve the above-described problem because it cannot appropriately adjust the intensity of stimulation to be provided according to contact of a user with a virtual object based on whether the user is aware of the contact.

SUMMARY OF THE INVENTION

The present invention is directed to a method for controlling a stimulation based on a result of a determination as to whether a user has consciously performed contact with a virtual object in the case of notifying, to the user, contact of the user with the virtual object using stimulation.

According to an aspect of the present invention, an information-processing apparatus configured to generate an image in a virtual space including a virtual object based on position and orientation information about a viewpoint of a user includes an acquisition unit configured to acquire positional information about a stimulation generation unit, which stimulation unit is arranged so as to be capable of applying stimulation to a body of the user, a determination unit configured to determine whether the virtual object and the stimulation generation unit contact each other based on position and orientation information about the virtual object and the positional information about the stimulation generation unit, and to determine whether the stimulation generation unit is included within an attention range to which the user draws attention from the viewpoint if it is determined that the virtual object and the stimulation generation unit contact each other, and an output unit configured to generate operation setting information for controlling an operation of the stimulation generation unit according to a result of determination by the determination unit and to output the generated operation setting information to the stimulation generation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

In each of the following exemplary embodiments of the present invention, a system is described that implements an interaction between a user and a virtual space using an HMD, which is an example of a head-mounted type display apparatus, and a plurality of stimulation generation units mounted at a plurality of positions (regions) of the body of the user.

First Exemplary Embodiment

A first exemplary embodiment of the present invention is described below. To begin with, a system according to the first exemplary embodiment of the present invention is described with reference to FIGS. 1 and 2.

Figure 1:
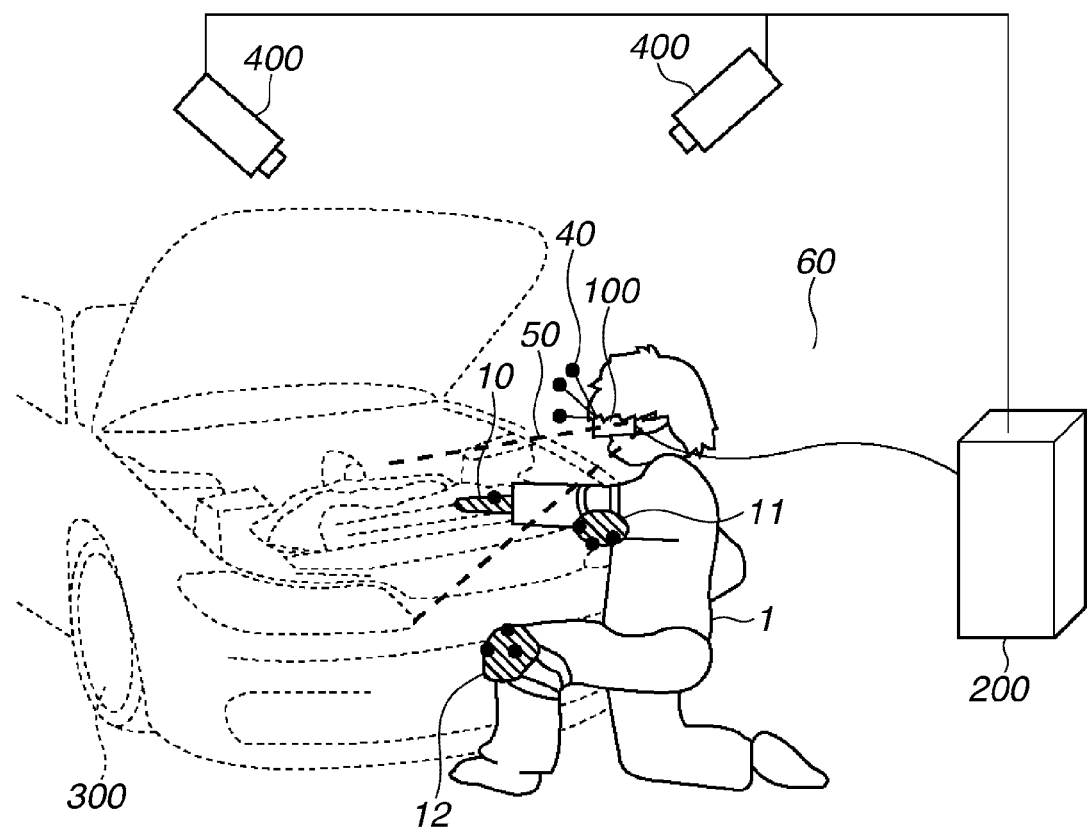
FIG. 1 illustrates an exemplary state of a system, which is being used by a user, according to a first exemplary embodiment of the present invention.

FIG. 1 illustrates an exemplary state of a system, which is being used by a user, according to the present exemplary embodiment.

Figure 2:
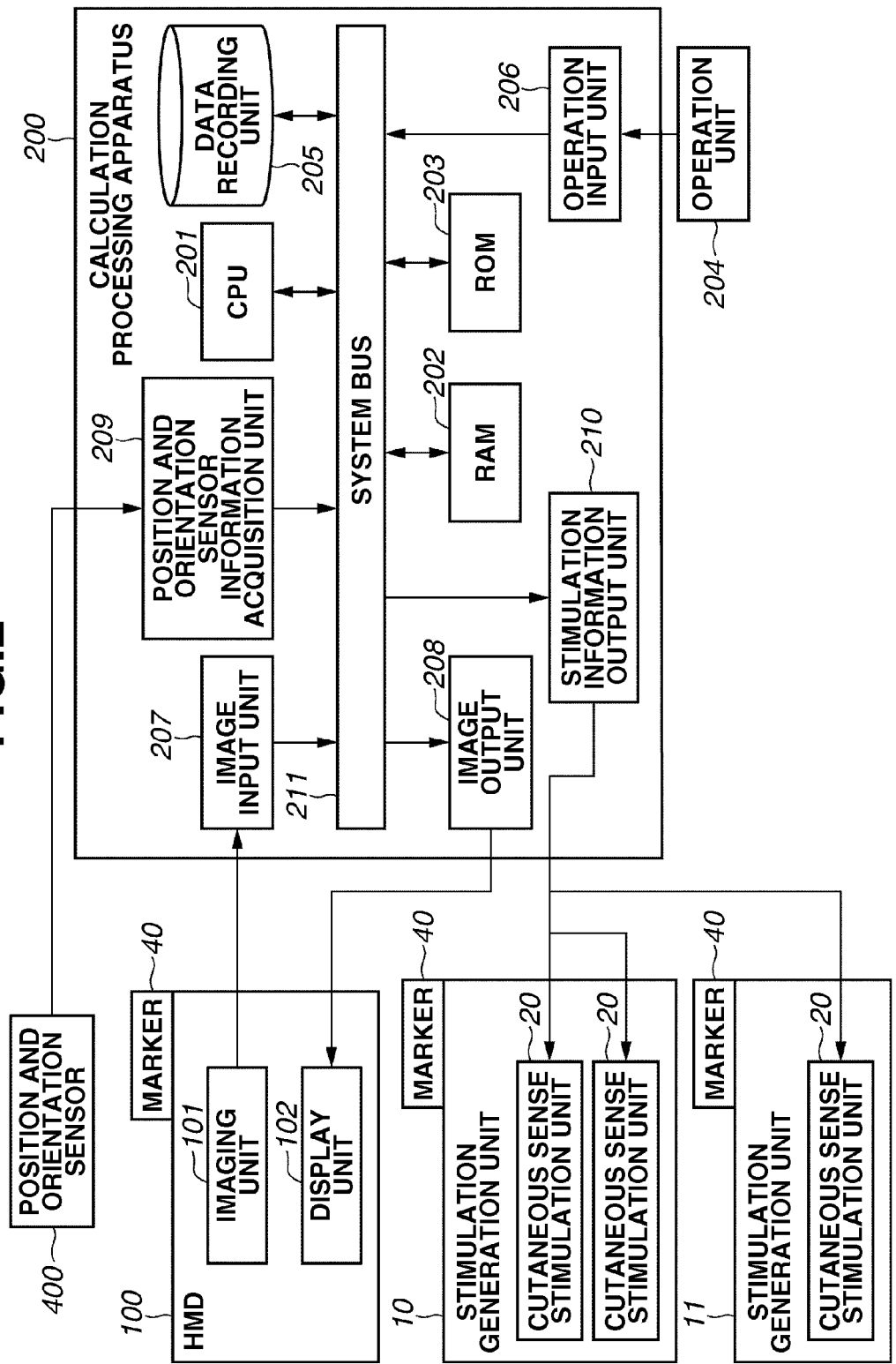
FIG. 2 illustrates an example of a hardware configuration of the system according to the first exemplary embodiment of the present invention.

FIG. 2 illustrates an example of a hardware configuration of the system according to the present exemplary embodiment.

Referring to FIG. 1, stimulation generation units 10, 11, and 12 are mounted on the body of a user 1. Furthermore, an HMD 100 is mounted on the head of the user 1. Accordingly, the user 1 can experience a virtual space including a virtual object 300 with both a visual sense and a tactile sense.

In the example illustrated in FIG. 1, the virtual object 300 is a virtually expressed imitation image of an automobile in an actual size. The user 1, in FIG. 1, is currently performing a verification operation with respect to an operation to be performed on an engine compartment of the automobile.

Furthermore, the stimulation generation unit 10 is mounted on the hand of the user 1. The stimulation generation unit 11 is mounted on the elbow of the user 1. The stimulation generation unit 12 is mounted on the knee of the user 1.

Moreover, one or more marker(s) 40 are provided to each of the stimulation generation units 10, 11, and 12 and the HMD 100. A position and orientation sensor 400 acquires position and orientation information indicating the position and orientation of the marker 40. The position and orientation information about the marker 40 acquired by the position and orientation sensor 400 and a real space image obtained via the HMD 100 are input to a calculation processing apparatus (information-processing apparatus) 200.

Then, the calculation processing apparatus 200 outputs a combined image including a virtual space image and a real space image to the HMD 100 by performing various types of processing. Furthermore, the calculation processing apparatus 200 outputs operation setting information for controlling an operation of each of the stimulation generation units 10, 11, and 12. Here, the HMD 100 is generally a video see-through type HMD. In the example illustrated in FIG. 2, the HMD 100 includes an imaging unit 101 and a display unit 102.

The imaging unit 101 captures a moving image of the real space. Then, the imaging unit 101 sends the captured image (real space image) of each frame to the calculation processing apparatus 200, which is disposed at a subsequent stage. The calculation processing apparatus 200 combines the real space image and a virtual space image that has been generated by the calculation processing apparatus 200. Processing for combining the real space image and the virtual space image will be described in detail below.

Then, the calculation processing apparatus 200 sends the combined image generated by the combining processing to the HMD 100.

The display unit 102 includes a liquid crystal display (LCD) screen. The display unit 102 is mounted on the HMD 100 at a position thereof at which the display unit 102 is positioned just in front of the viewpoint of the user 1, who wears the HMD 100 on his head. The display unit 102 displays the combined image sent from the calculation processing apparatus 200. However, it is also useful if the display unit 102 can further displays other information.

Here, by matching an optical axis of the imaging unit 101 and that of the display unit 102, a parallax between the image that has been captured by the imaging unit 101 and the above-described combined image can be suppressed. Thus, the user 1 can look at the virtual space image and a real space image from the viewpoint of user 1 without feeling uncomfortable. Here, a publicly known method can be used as the method for visually presenting a real object and a virtual object. Accordingly, a detailed description thereof is omitted here.

Furthermore, as described above, one or more marker(s) 40 are provided to the HMD 100. As described above, in FIG. 1, the stimulation generation units 10, 11, and 12 are mounted at the hand, the elbow, and the knee of the user 1, respectively.

However, the number of and the mounting positions of the stimulation generation units are not limited to those described above. In the present exemplary embodiment, the stimulation generation units 10, 11, and 12 each have a glove-like shape or an athletic supporter-like shape to be smoothly mounted on a region of the user's body.

Figure 3:
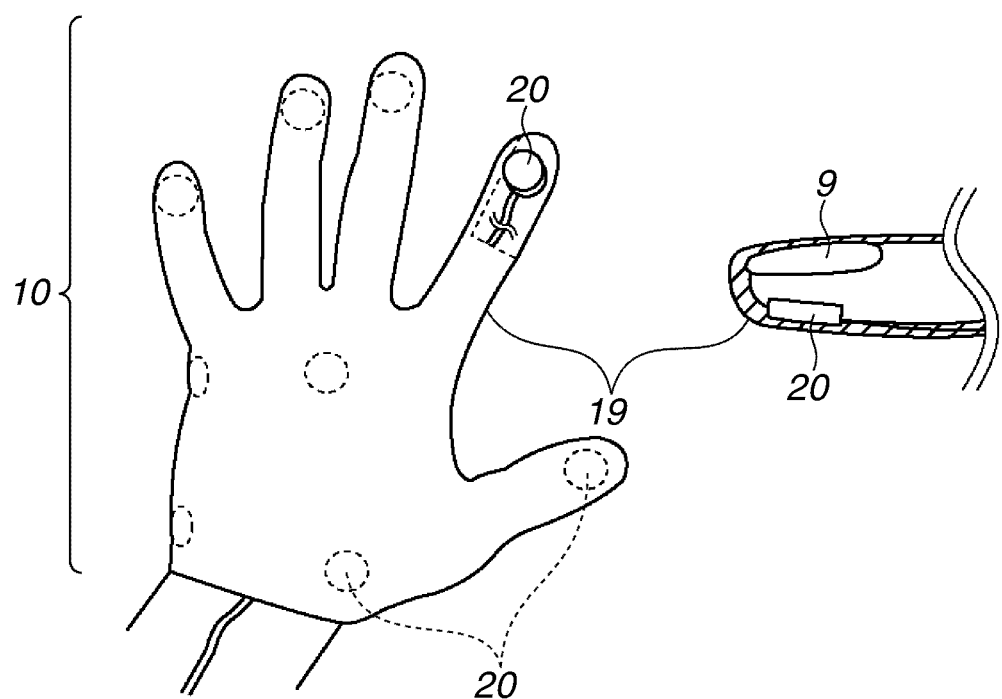
FIG. 3 illustrates an example of a configuration of a stimulation generation unit illustrated in FIG. 2.

FIG. 3 illustrates an example of a configuration of the stimulation generation unit 10 (FIG. 2) according to the present exemplary embodiment.

Referring to FIG. 3, the stimulation generation unit 10 includes a glove-like shaped main body unit 19 and one or more cutaneous sense stimulation units 20. Here, it is useful if the main body unit 19 has such a configuration that the cutaneous sense stimulation unit 20 closely contacts the human body 9 of the user 1 (the back of the user's hand in the example in FIG. 3) so that a stimulation generated by the cutaneous sense stimulation unit 20 is transmitted to the human body 1 with an intensity high enough for the user 1 to recognize the vibration.

The cutaneous sense stimulation unit 20 includes a vibration motor, for example. Here, with respect to the cutaneous sense stimulation unit 20, it is useful if a plurality of cutaneous sense stimulation units 20 are mounted on regions of the user's body at the front or the back of the hands and is selected and driven according to user's contact with a virtual object by the body region.

Similarly, with respect to the stimulation generation unit 11 and the stimulation generation unit 12 having an elbow-like shape or a knee supporter-like shape, one or more cutaneous sense stimulation units 20 are provided.

In the example illustrated in FIG. 3, a vibration motor is used as the cutaneous sense stimulation unit 20.

The vibration motor generates a vibration by rotating an eccentric weight mounted around a rotation shaft of the vibration motor. Here, either a cylinder-like shaped vibration motor or a coin-like shaped (flat-shaped) vibration motor can be generally used as the vibration motor. In the example illustrated in FIG. 3, a coin-like shaped (flat-shaped) vibration motor is used.

Here, a vibration motor is relatively small-sized but can generate a high level of stimulation. Accordingly, it is useful if a plurality of cutaneous sense stimulation units 20 each including a vibration motor presents a stimulation at each of a plurality of regions of the user's body as in the present exemplary embodiment.

However, the present invention is not limited to this. That is, the cutaneous sense stimulation unit 20 can include a device other than the vibration motor, which can apply a stimulation to the cutaneous sense of the user. As for a method for presenting a stimulation to the cutaneous sense of the user, a mechanical stimulation generation method, an electrical stimulation generation method, or a thermal stimulation generation method can be used. That is, various types of devices can be used as the cutaneous sense stimulation unit 20 according to the stimulation generation method.

In this regard, for example, a voice-coil type device that generates a mechanical vibration stimulation can be used as the cutaneous sense stimulation unit 20.

Furthermore, a device that includes a pin-like portion configured to contact the body of a user and operated by an actuator such as a piezoelectric element or a polymeric actuator to provide a stimulation can be used as the cutaneous sense stimulation unit 20.

In addition, a device that provides pressure on a skin of the user with an air pressure can be used as the cutaneous sense stimulation unit 20.

Moreover, a device that provides an electrical stimulation to the user using an array of microelectrodes can be used as the cutaneous sense stimulation unit 20. In addition, a device that uses an electrothermal device to provide a thermal stimulation can be used as the cutaneous sense stimulation unit 20. As described above, various types of devices can be used as the cutaneous sense stimulation unit 20.

In the following description of the exemplary embodiments of the present invention, the device used as the cutaneous sense stimulation unit 20 can generate a stimulation with any method if the content of the operation (the operation for controlling the stimulation intensity) to be performed by the cutaneous sense stimulation unit 20 can be set via the calculation processing apparatus 200.

As described above, the position and orientation sensor 400 acquires position and orientation information about the marker 40. Accordingly, the position and orientation sensor 400 can detect the position and orientation of the HMD 100 and the stimulation generation units 10, 11, and 12, on each of which the marker 40 is disposed.

In the present exemplary embodiment, the position and orientation sensor 400 and the marker 40 constitute an optical position and orientation acquisition system. The optical position and orientation acquisition system includes a plurality of position and orientation sensors 400 including a camera having an infrared radiation function and a plurality of markers 40 made of a retroreflective material. Here, each of the markers 40 disposed at respective different three-dimensional positions is provided with a unique identification (ID).

Here, a publicly known method can be used for acquiring the position and orientation information about the device having the marker 40 (in the present exemplary embodiment, the HMD 100 and the stimulation generation units 10, 11, and 12). Accordingly, a detailed description thereof is omitted here.

However, the present invention is not limited to this. Various other methods for acquiring the position and orientation information about the HMD 100 and the stimulation generation units 10, 11, and 12 can be used. That is, the present invention is not limited to a method that uses the position and orientation sensor 400 and the marker 40.

For example, a method that uses a magnetic sensor can be used for acquiring the position and orientation information about the HMD 100 and the stimulation generation units 10, 11, and 12. In this method, a transmitter for generating a magnetic field is provided in the real space, and the HMD 100 and the stimulation generation units 10, 11, and 12 each have a receiver for detecting a change in the magnetic field occurring accordingly as the HMD 100 or the stimulation generation units 10, 11, and 12 change their position and orientation within the magnetic field.

In addition, the method acquires the position and orientation information in a sensor coordinate system of each of the receivers based on a signal indicating a result of the detection by the receiver. Here, the sensor coordinate system has an origin point that denotes a position of the transmitter and an x-axis, a y-axis, and a z-axis orthogonal to one another at the origin point. With respect to the method for acquiring the position and orientation information, a sensor system using another method, such as an ultrasonic system, can be used.

In addition, a method can be used for acquiring the position and orientation information by capturing, with a camera, an image of each of the markers mounted on the HMD 100 and the stimulation generation units 10, 11, and 12.

Furthermore, it is useful to acquire the position and orientation information about the stimulation generation units 10, 11, and 12 using a publicly known motion capture method.

Moreover, in the case of using a glove-like shaped stimulation generation unit 10 as illustrated in FIG. 3, it is useful to acquire the position and orientation of the hand of the user with an optical sensor and to acquire the position and orientation of each finger with a finger position acquisition method using a mechanical sensor or an optical fiber. As described above, the method for acquiring the position and orientation information about the HMD 100 and the stimulation generation units 10, 11, and 12 is not particularly limited to those described above.

In the present exemplary embodiment, the position and orientation information about the HMD 100 and the position and orientation information about the stimulation generation units 10, 11, and 12 acquired by the position and orientation sensor 400 are sent to the calculation processing apparatus 200. The calculation processing apparatus 200 includes a general-purpose personal computer (PC), for example.

A central processing unit (CPU) 201 uses a program and data stored on a random access memory (RAM) 202 or a read-only memory (ROM) 203 to control the operation of the calculation processing apparatus 200. Furthermore, each of the following processing operations performed by the calculation processing apparatus 200 is performed with the CPU 201 as the main unit of performing the processing.

The RAM 202 includes an area for temporarily storing a program or data loaded or sent from a data recording unit 205 and the position and orientation information acquired by a position and orientation sensor information acquisition unit 209 from the position and orientation sensor 400.

Furthermore, the RAM 202 includes an area for temporarily storing the data of a real space image, which an image input unit 207 has acquired from the imaging unit 101. In addition, the RAM 202 includes a work area used for performing various types of processing with the CPU 201. That is, the RAM 202 can provide various storage areas as necessary.

The ROM 203 stores a boot program and various setting data. An operation input unit 206 functions as an interface for connecting an operation unit 204 to the calculation processing apparatus 200.

The operation unit 204 includes a keyboard and a mouse. An operator (user) can perform an operation via the calculation processing apparatus 200 to input various instructions to the CPU 201 via the operation input unit 206.

The data recording unit 205 is a mass storage device, such as a hard disk drive (HDD). The data recording unit 205 stores an operating system (OS) and a program and data used when the CPU 201 of the calculation processing apparatus 200 executes each of the following processing operations.

The program includes a program for executing each processing according to a flow of processing to be executed by the CPU 201. In addition, the data includes data related to each virtual object constituting a virtual space and data related to a light source that irradiates a virtual space with a light beam.

Furthermore, the data recording unit 205 stores publicly known information and information that a person skilled in the art can easily arrive at using in performing the following processing. The program and the data stored in the data recording unit 205 are loaded therefrom to the RAM 202 under the control of the CPU 201.

The CPU 201 uses the program and data loaded on the RAM 202 to perform each processing.

It is useful if the information temporarily stored on the RAM 202 is temporarily stored in the data recording unit 205. The image input unit 207 and an image output unit 208 function as an interface for connecting the HMD 100 to the calculation processing apparatus 200. Data of a real space image sent from the imaging unit 101 of the HMD 100 is stored on the RAM 202 or the data recording unit 205 via the image input unit 207.

Furthermore, a combined image generated by the calculation processing apparatus 200 is output to the display unit 102 of the HMD 100 via the image output unit 208. The position and orientation sensor information acquisition unit 209 functions as an interface for connecting the position and orientation sensor 400 to the calculation processing apparatus 200.

The position and orientation information acquired by the position and orientation sensor 400 is input to the calculation processing apparatus 200 via the position and orientation sensor information acquisition unit 209, and then is stored on the RAM 202 or the data recording unit 205.

The stimulation information output unit 210 functions as an interface for connecting the cutaneous sense stimulation unit 20 to the calculation processing apparatus 200. The operation setting information generated by the calculation processing apparatus 200 is output to a specified cutaneous sense stimulation unit 20 via the stimulation information output unit 210.

Each of the image input unit 207, the image output unit 208, the position and orientation sensor information acquisition unit 209, and the stimulation information output unit 210 includes an analog video port, a digital input and output (I/O) port (IEEE 1394, for example), a serial port, such as Recommended Standard 232C (RS232C) or a universal serial bus (USB), or Ethernet®. The above-described components of the calculation processing apparatus 200 are connected to a system bus 211.

Now, processing performed by the calculation processing apparatus 200 is described in detail below. The calculation processing apparatus 200 performs the following processing in addition to generating a virtual space image according to the position and orientation of the HMD 100, combining the generated virtual space image with a real space image captured by the imaging unit 101, and sending the combined image to the display unit 102. That is, the calculation processing apparatus 200 detects whether the stimulation generation unit 10, 11, or 12 contacts a virtual object.

If it is determined that the stimulation generation unit 10, 11, or 12 contacts the virtual object, then the calculation processing apparatus 200 determines whether the contacting stimulation generation unit is included in an attention range (area) to which the user 1 draws attention.

Then, the calculation processing apparatus 200 controls an operation of any of the stimulation generation units 10, 11, and 12 that contacts the virtual object.

In the example illustrated in FIG. 1, a range 50, which is an attention range, and a range 60, which is a range other than the range 50, are illustrated. Here, the range 60 is referred to as a "non-attention range".

The attention range 50 is a range in which the user 1 can perceive a virtual object with the visual sense and a part thereof. Accordingly, the attention range 50 is not limited to a precisely-measured human sight but can be an artificially set range.

Referring to FIG. 1, in the attention range 50, a virtual contact occurs between the region (hand) of the user, on which the stimulation generation unit 10 is mounted, and the virtual object 300.

On the other hand, in the non-attention range 60, a virtual contact occurs between the region (knee) on which the stimulation generation unit 12 is mounted and the virtual object 300. In this case, in the present exemplary embodiment, the calculation processing apparatus 200 controls the stimulation generation unit 10 and the stimulation generation unit 12 to generate respective different stimulations. In this regard, the control of operation of the stimulation generation units 10, 11, and 12 performed by the calculation processing apparatus 200 is described in detail below.

Figure 4:
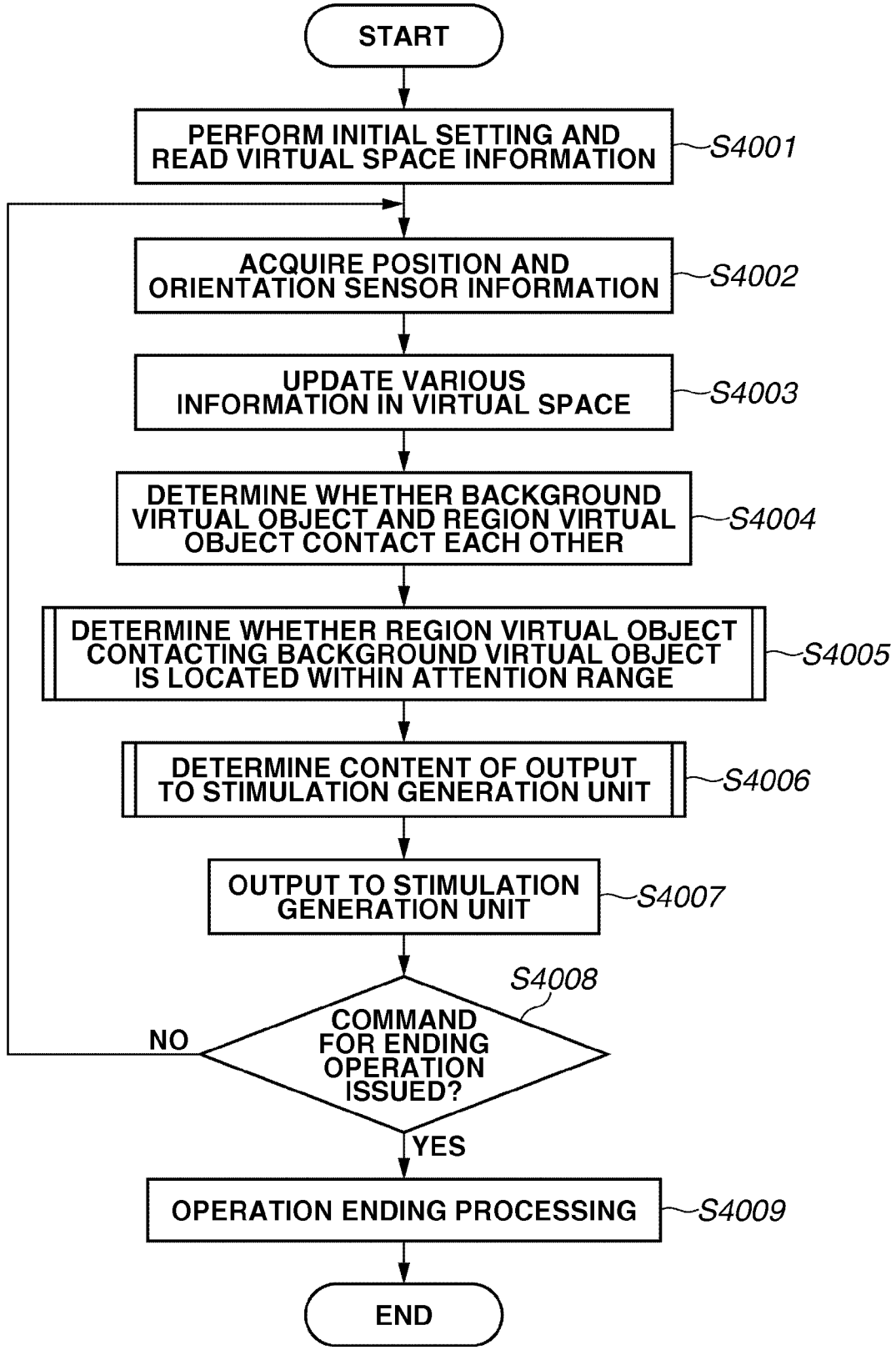
FIG. 4 is a flow chart of processing for controlling an operation of each stimulation generation unit by a calculation processing apparatus (computer) illustrated in FIG. 2.

FIG. 4 is a flow chart of processing performed by the calculation processing apparatus 200 for controlling an operation of each of the stimulation generation units 10, 11, and 12 according to the present exemplary embodiment.

The program and data used for performing the processing according to the flow chart of FIG. 4 with the CPU 201 are stored in the data recording unit 205. The CPU 201 loads the program and data from the data recording unit 205 onto the RAM 202.

The CPU 201 of the calculation processing apparatus 200 performs the processing according to the flow chart of FIG. 4, which will be described in detail below, by performing the processing using the loaded program and data.

Referring to FIG. 4, in step S4001, the CPU 201 performs processing for loading various data to be used in processing for initializing the calculation processing apparatus 200 and subsequent processing from the data recording unit 205 onto the RAM 202. The data loaded from the data recording unit 205 onto the RAM 202 includes various information used in a virtual space (virtual space information).

In step S4002, the CPU 201 acquires position and orientation information about the HMD 100 and position and orientation information about the stimulation generation units 10, 11, and 12 sent from the position and orientation sensor 400 via the position and orientation sensor information acquisition unit 209 and stores the acquired information on the RAM 202.

In step S4003, the CPU 201 sets the position and orientation information about the HMD 100 acquired in step S4002 as the position and orientation information about the current viewpoint of the user 1. Furthermore, the CPU 201 sets the position and orientation information about each of the stimulation generation units 10, 11, and 12 acquired in step S4002 as position and orientation information about a virtual object (hereinafter simply referred to as a "region virtual object") disposed according to the position and orientation of each of the stimulation generation units 10, 11, and 12. That is, the CPU 201 sets the region virtual object corresponding to each stimulation generation unit according to the position and orientation of each of the stimulation generation units 10, 11, and 12.

In the case where the position and orientation of the virtual object existing in the virtual space changes, the CPU 201 determines the position and orientation information after the change. The CPU 201 updates various information in the virtual space as described above.

Here, an outline of the region virtual object is described. As described above, the region virtual object corresponding to the stimulation generation unit 10 is disposed in the virtual space according to the position and orientation of the stimulation generation unit 10.

The region virtual object corresponding to the stimulation generation unit 11 is disposed in the virtual space according to the position and orientation of the stimulation generation unit 11.

The region virtual object corresponding to the stimulation generation unit 12 is disposed in the virtual space according to the position and orientation of the stimulation generation unit 12. Accordingly, the position and orientation of each of the stimulation generation units 10, 11, and 12 is reflected in the virtual space. The interaction between each of the stimulation generation units 10, 11, and 12 and the virtual space is available in this manner.

Hereinbelow, a virtual object other than the region virtual objects is referred to as a "background virtual object". That is, the virtual space includes the background virtual object, and the region virtual objects are disposed in the virtual space according to the position and orientation of each stimulation generation unit.

Furthermore, hereinbelow, the region virtual object and the background virtual object may be collectively referred to as a "virtual object" in the description common thereto.

What is characteristic about the region virtual object as one type of a virtual object will be described in detail below. In this regard, the region virtual object is disposed in the virtual space in terms of the calculation therefor. Thus, the region virtual object can be left unrendered. As described above, "processing for constructing a virtual space", namely, processing for disposing the background virtual object and the light source in the virtual space, is performed in parallel to performing the processing in the flow chart of FIG. 4.

Thus, in step S4004, the CPU 201 determines whether each of the background virtual objects disposed by the above-described processing in the virtual space and each of the region virtual objects disposed in the virtual space in step S4003 interfere with each other. That is, the CPU 201 determines whether any background virtual object and any region virtual object contact each other. The determination as to whether the virtual objects interfere with each other can be performed according to a publicly known method.

In step S4005, the CPU 201 determines whether the region virtual object contacting the background virtual object is located within the attention range (corresponding to the attention range 50 in FIG. 1) (attention determination processing).

The method for calculating an attention range will be described in detail below. Furthermore, the processing in step S4005 will also be described in detail below.

In step S4006, the CPU 201 generates operation setting information for controlling an operation of the stimulation generation unit corresponding to the region virtual object contacting the background virtual object. The operation setting information can differ according to whether the region virtual object contacting the background virtual object is located within the attention range.

Suppose, for example, that both the region virtual object disposed according to the position and orientation of the stimulation generation unit 10 and the region virtual object disposed according to the position and orientation of the stimulation generation unit 11 contact the background virtual object.

If the region virtual object disposed according to the position and orientation of the stimulation generation unit 10 is located within the attention range and the region virtual object disposed according to the position and orientation of the stimulation generation unit 11 is not located within the attention range, the operation setting information generated for the stimulation generation unit 10 differs from that generated for the stimulation generation unit 11. That is, the intensity of the stimulation indicated in each operation setting information mutually differs. The processing in step S4006 will be described in detail below.

In step S4007, the CPU 201 outputs, via the stimulation information output unit 210, the operation setting information generated in step S4006 to the stimulation generation unit (in the present exemplary embodiment, the cutaneous sense stimulation unit 20) corresponding to the region virtual object contacting the background virtual object. After receiving the operation setting information, the stimulation generation unit operates to generate a stimulation of the intensity indicated by the operation setting information.

If it is determined by the CPU 201 that the user has issued an instruction for ending the processing via the operation unit 204 or if a condition for ending the processing is satisfied (YES in step S4008), then the processing advances from step S4008 to step S4009.

On the other hand, if it is determined by the CPU 201 that the user has not issued any instruction for ending the processing via the operation unit 204 or if no condition for ending the processing is satisfied (NO in step S4008), then the processing returns from step S4008 to step S4002 to repeat the processing in step S4002 and subsequent steps.

Now, the processing in step S4004, namely, processing for determining whether the region virtual object interferes with the background virtual object, is described in detail below.

As described above, the data for the region virtual object and the data for the background virtual object are previously stored in the data recording unit 205. Here, the data for each virtual object includes virtual object shape information and texture map data.

The shape information includes, in the case where the virtual object is constructed with a polygon, normal line vector data with respect to each polygon and data of each vertex constituting the polygon, for example.

In the case of performing processing for determining whether the region virtual object interferes with the background virtual object, only the shape information of the data of each virtual object is used.

If the virtual object has a complicated shape, the size of the shape information becomes large. Accordingly, in performing processing for determining whether virtual objects having a complicated shape interfere with each other, processing for determining the presence or absence of interface between the virtual objects is performed using the large-sized shape information. In this case, a large amount of processing load may arise.

Accordingly, in performing processing for determining whether the background virtual object and the region virtual object interfere with each other, it is useful to generate a pseudo-shape virtual object based on the background virtual object and using less detailed information about the shape thereof and a pseudo-shape virtual object based on the region virtual object and using less detailed information about the shape thereof and to perform processing for determining whether the generated pseudo-shape virtual objects interfere with each other.

Here, a pseudo-shape virtual object of a virtual object can be generated based on shape information whose data amount is small (shape information indicating a relatively low degree of detailedness) using a publicly known polygon reduction method based on the shape information about the virtual object.

Alternatively, the shape information used for performing the processing for determining the presence or absence of interference can be previously generated and stored in the data recording unit 205 instead of generating the same in real time during the interference determination processing. In this regard, various methods can be used for determining whether the virtual objects interfere with each other. In the present exemplary embodiment, any method for determining the presence or absence of interference can be used.

Furthermore, the virtual object can be constructed by an element other than a polygon. Moreover, the content of the interference determination processing can be changed according to the element of the virtual object. That is, in the present exemplary embodiment, on what kind of interference the processing according to the present exemplary embodiment is performed is not significant. Accordingly, any method that can detect an interference between the virtual objects can be used.

Now, the processing in step S4005 is described with reference to FIGS. 5 and 6. More specifically, processing for determining whether the region virtual object contacting the background virtual object is located within the attention range (corresponding to the attention range 50 in FIG. 1) is described below.

Figure 5:
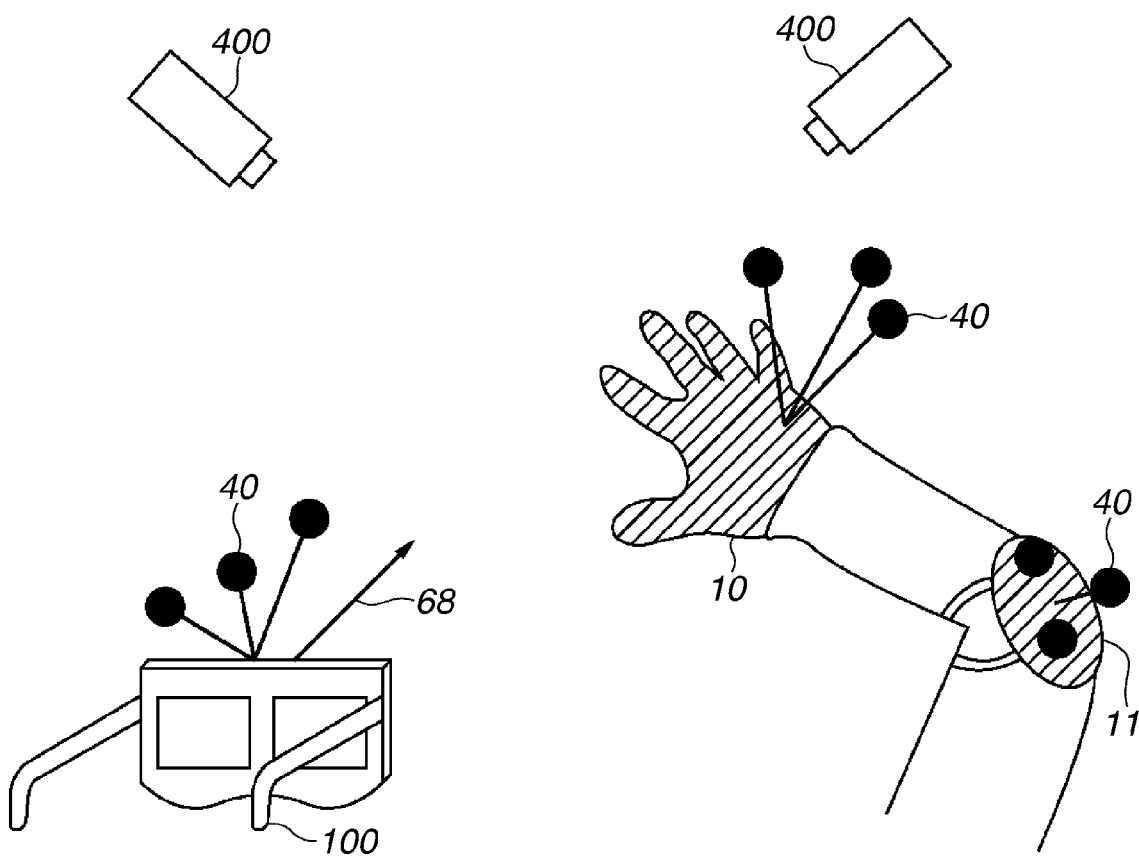
FIG. 5 illustrates an example of a state of a real space in which an arm of a user wearing a plurality of stimulation generation units, position and orientation sensors, and an HMD are included.

FIG. 5 illustrates an example of a state of the real space including the arm of the user 1 on which the stimulation generation units 10 and 11 are mounted, the position and orientation sensors 400, and the HMD 100 according to the present exemplary embodiment.

Figure 6:
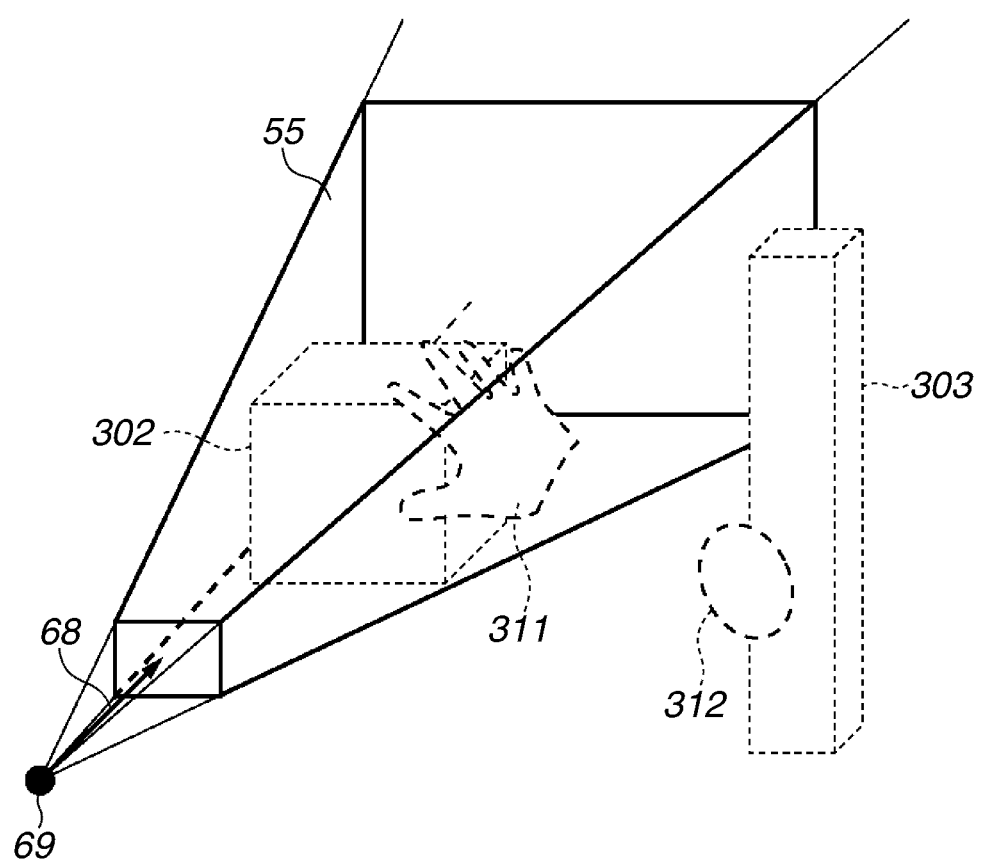
FIG. 6 illustrates an example of a virtual space when the state of the real space is in the state illustrated FIG. 5.

FIG. 6 illustrates an example of a virtual space when the state of the real space is in the state illustrated FIG. 5. Accordingly, the state that is a combination of the real space (FIG. 5) and the virtual space (FIG. 6) is presented to the user 1 who wears the HMD 100. However, the virtual space and the real space are described separately from each other for easier understanding.

Referring to FIG. 5, The stimulation generation unit 10 is mounted on the hand of the user 1 as described above. The stimulation generation unit 11 is mounted on the elbow of the user 1. A plurality of markers 40 is provided on each of the stimulation generation units 10 and 11. Furthermore, the marker 40 is provided on the HMD 100.

Moreover, the position and orientation sensor 400 monitors each of the markers 40. A line-of-sight direction vector 68 is indicated by an orientation component of the position and orientation information about the HMD 100. The line-of-sight direction vector 68 is a vector whose initial point is taken at a position indicated by a position component of the position and orientation information about the HMD 100.

On the other hand, referring to FIG. 6, background virtual objects 302 and 303 are disposed in the virtual space. Here, a viewpoint 69 of the user 1 indicates a point having a position and orientation measured by the position and orientation sensor 400 as the position and orientation of the HMD 100 in the state where the HMD 100 is in the position and orientation illustrated in FIG. 5. A region virtual object 311 is disposed according to the position and orientation of the stimulation generation unit 10. A region virtual object 312 is disposed according to the position and orientation of the stimulation generation unit 11.

Here, in the example illustrated in FIG. 6, each of the region virtual objects 311 and 312 is a virtual object generated by imitating a shape of the stimulation generation units 10 and 11 corresponding thereto. The region virtual objects 311 and 312 can have any other form. However, it is desirable that the region virtual object is a virtual object generated by imitating the shape of the corresponding stimulation generation unit or a virtual object generated by imitating the shape of the region of the body of a user who wears the corresponding stimulation generation unit.

This is because it is useful, in increasing the degree of reality of the interference determination processing, to perform processing for determining the presence of interference with the background virtual object based on the shape of the stimulation generation unit or the shape of the region of the user who wears the stimulation generation unit.

A view volume 55 is calculated based on viewpoint information included in the position and orientation information and angle of view information of the viewpoint 69. As the view volume 55, a view volume (a view volume corresponding to a virtual sight for looking at the virtual space) set in the case of drawing a virtual space image can be generally used.

In this case, the view volume 55 indicates a range of the virtual space drawn on the display unit 102 of the HMD 100.

In the example illustrated in FIG. 6, the view volume 55 includes the horizontal and vertical angles of view of the HMD 100 and two planes orthogonal to the line-of-sight direction vector 68. The two planes include a plane positioned closer to the viewpoint 69 (a front clipping plane) and a plane positioned farther from the viewpoint 69 (a rear clipping plane).

Here, it is useful if the view volume 55 is calculated again upon any change in information about the viewpoint 69 and the shape and the size thereof can be determined as appropriate.

Furthermore, information necessary for generating the view volume 55 (information other than the position and orientation information about the viewpoint 69) is previously recorded in the data recording unit 205. Here, the view volume 55 is used as the attention range.

In the example illustrated in FIG. 6, the region virtual object 311 and the background virtual object 302 contact each other. In addition, the region virtual object 312 and the background virtual object 303 contact each other.

Furthermore, In the example illustrated in FIG. 6, the region virtual object 311 is located within the view volume 55, while the region virtual object 312 is located outside the view volume 55. Here, it can be presumed that the user 1 draws attention to the stimulation generation unit corresponding to the region virtual object included within the attention range, of the region virtual objects contacting the background virtual objects.

On the other hand, with respect to the stimulation generation unit corresponding to the region virtual object that is not included within the attention range, it can be presumed that the user 1 does not draw attention.

In the present exemplary embodiment, the CPU 201 performs processing for determining whether each of the virtual objects exists inside or outside the view volume 55 according to the positional relationship between the view volume calculated as the attention range and the region virtual object contacting the background virtual object.

In the example illustrated in FIG. 6, the region virtual object 311 contacting the background virtual object 302 exists inside the view volume 55. Accordingly, in this case, it can be presumed that the user 1 draws attention to the region on which the stimulation generation unit 10 is mounted.

On the other hand, the region virtual object 312 contacting the background virtual object 303 exists outside the view volume 55. Accordingly, in this case, it can be presumed that the user 1 does not draw attention to the region on which the stimulation generation unit 11 is mounted.

Then, in this case, the CPU 201 generates different operation setting information for the stimulation generation unit 10 and the stimulation generation unit 11 to cause the stimulation generation unit 10 and the stimulation generation unit 11 to generate stimulations of respective different intensity levels.

Figure 7:
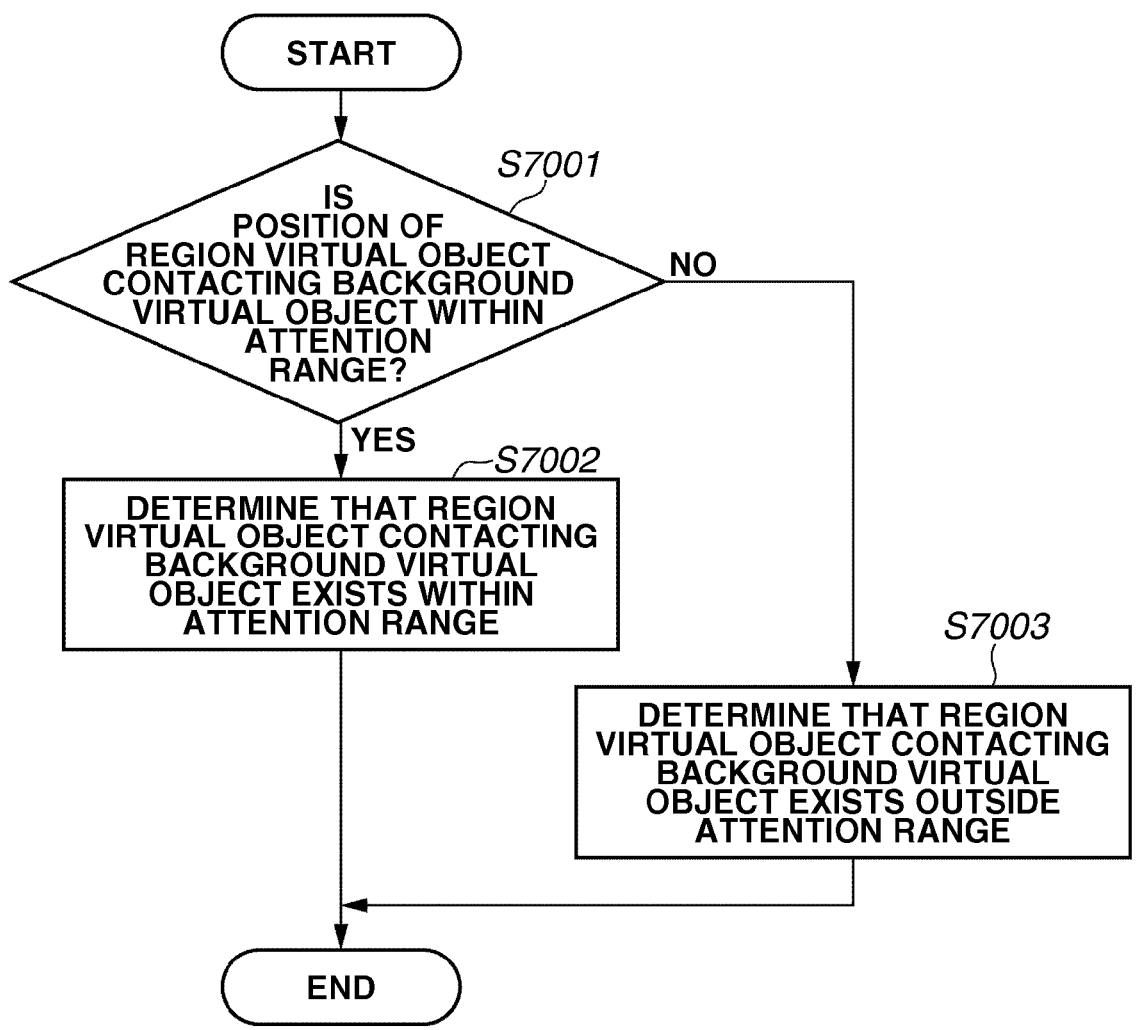
FIG. 7 is a flow chart illustrating an exemplary flow of processing in step S4005 illustrated in FIG. 4.

FIG. 7 is a flow chart illustrating an exemplary detailed flow of processing in step S4005.

Here, in step S4005, the CPU 201 does not process all of the region virtual objects but processes the region virtual object that has been determined to contact the background virtual object in the interference determination processing in step S4004. In step S7001, the CPU 201 determines whether the position included in the positional information about each region virtual object that has been determined to contact the background virtual object is inside the view volume (within the attention range).

If it is determined in step S7001 that the position included in the positional information about the region virtual object that has been determined to contact the background virtual object is inside the view volume (within the attention range) (YES in step S7001), then the CPU 201 advances to step S7002. In step S7002, the CPU 201 records identification information (an ID, for example) unique to the region virtual object on the RAM 202.

On the other hand, if it is determined in step S7001 that the position included in the positional information about the region virtual object that has been determined to contact the background virtual object is outside the view volume (NO in step S7001), then the CPU 201 advances to step S7003. In step S7003, the CPU 201 records identification information (an ID, for example) unique to the region virtual object on the RAM 202.

In the above-described example, the view volume for displaying a virtual space is used as the attention range. However, the present invention is not limited to this. That is, a space having a quadrangular pyramid shape or a predetermined shape and set in the line-of-sight direction of the HMD 100 can be used as the attention range.

Figure 8:
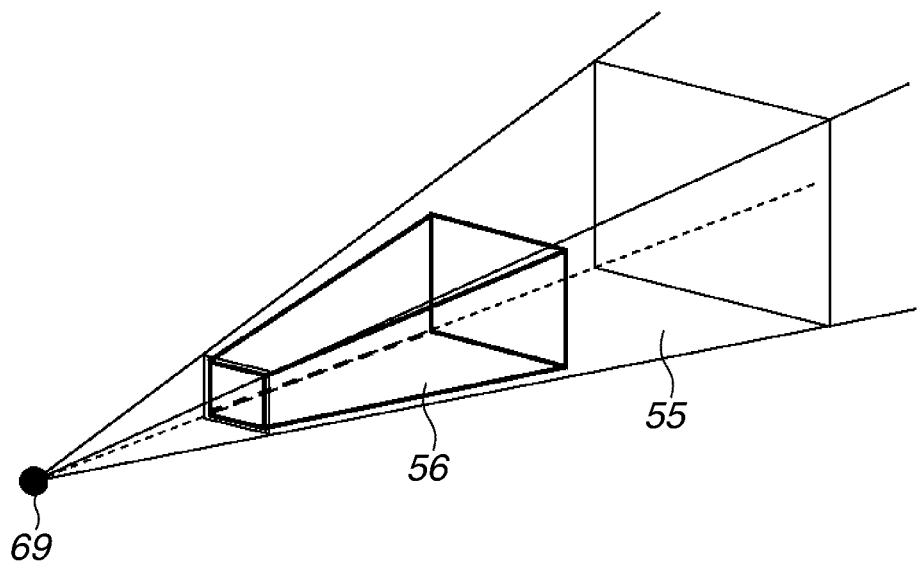
FIG. 8 illustrates an example of a method for setting an attention range.

FIG. 8 illustrates an example of another method for setting the attention range according to the present exemplary embodiment. In the example illustrated in FIG. 8, a space smaller than the view volume 55 is set for an attention range (attention determination space) 56. The attention determination space 56 is set smaller than a range that the user 1 can see (the view volume 55), because it is unlikely that the user 1 draws attention to a peripheral portion of the display area. If a region virtual object contacting the background virtual object exists inside the attention determination space 56, then the CPU 201 determines that the user 1 draws attention to the region virtual object.

Referring to FIG. 8, a plane equivalent to the rear clipping plane of the view volume 55 is moved in the direction of the viewpoint 69. Thus, a relatively small attention determination space 56 is set.

In the case of using a stimulation generation unit that is mounted directly on the human body as in the present exemplary embodiment, the view volume used for displaying the virtual object cannot contact a virtual object positioned at a distant position. Accordingly, the attention determination space 56 is customized as a space dedicated as the attention range with respect to contact between the user and the virtual object. With respect to the customization of the attention range, it is useful to determine its content based on human visual characteristics and content of the task (in the present exemplary embodiment, a verification work).

For example, the human visual field is generally approximately 60 degrees upward and approximately 75 degrees downward in the vertical direction. Accordingly, in the present exemplary embodiment, the attention range is set in the range of 60 degrees upward and 75 degrees downward of the HMD 100 even if the display apparatus includes an angle of view wider than that.

Furthermore, the human visual field includes a central visual field having a high resolution. The user 1 can observe an object with the central visual field in the case of performing a work with a visual verification (drawing attention to and touching an object). Accordingly, it is useful to set the attention range around the central visual field.

Moreover, the attention range may differ according to the type of the task. In this regard, it is useful to predetermine the attention range according to the type of a work-target object and the content of the verification to be performed.

Furthermore, it is useful to previously measure the eye movement of a user to presume and estimate the attention range in a task work to be performed and to set the attention range based on the presumed attention range. As described above, various methods can be arbitrarily selected and used for setting the attention range, although if the position and orientation of the viewpoint is changed, the attention range is to be set again according thereto.

Now, the processing in step S4006 is described in detail below. More specifically, the processing for generating operation setting information for controlling an operation of the stimulation generation unit corresponding to the region virtual object contacting the background virtual object is described below.

Figure 9:
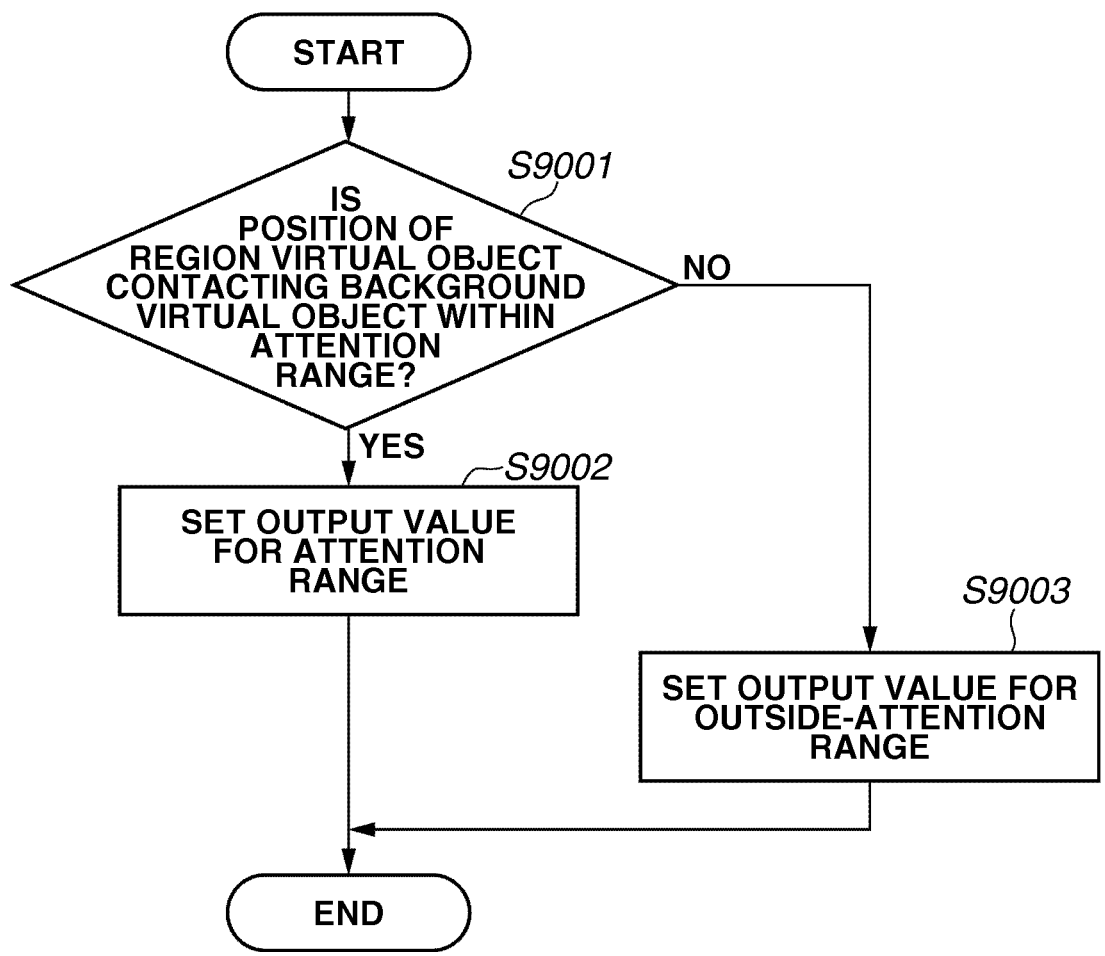
FIG. 9 is a flow chart illustrating an example of a detailed flow of processing in step S4006 illustrated in FIG. 4.

FIG. 9 is a flow chart illustrating exemplary processing in step S4006 according to the present exemplary embodiment. Referring to FIG. 9, in step S9001, the CPU 201 determines whether the position included in the positional information about each region virtual object that has been determined to contact the background virtual object is inside the view volume (within the attention range).

If it is determined in step S9001 that the position included in the positional information about the region virtual object that has been determined to contact the background virtual object is inside the view volume (within the attention range) (YES in step S9001), then the CPU 201 advances to step S9002. In step S9002, the CPU 201 performs processing on the ID information recorded on the RAM 202 in step S7002 (FIG. 7).

On the other hand, if it is determined in step S9001 that the position included in the positional information about the region virtual object that has been determined to contact the background virtual object is outside the view volume (NO in step S9001), then the CPU 201 advances to step S9003. In step S9003, the CPU 201 performs processing on the ID information recorded on the RAM 202 in step S7003 (FIG. 7).

In step S9002, the CPU 201 identifies the region virtual object corresponding to the ID information recorded on the RAM 202 in step S7002.

Then, the CPU 201 generates (sets) operation setting information to be set for the stimulation generation unit corresponding to the identified region virtual object (operation setting information for the region virtual object inside the attention range).

On the other hand, in step S9003, the CPU 201 identifies the region virtual object corresponding to the ID information recorded on the RAM 202 in step S7003.

Then, the CPU 201 generates (sets) operation setting information to be set for the stimulation generation unit corresponding to the identified region virtual object (operation setting information for the region virtual object outside the attention range).

In the example illustrated in FIG. 6, the CPU 201 sets the operation setting information for the region virtual object inside the attention range with respect to the stimulation generation unit 10. On the other hand, the CPU 201 sets the operation setting information for the region virtual object outside the attention range with respect to the stimulation generation unit 11.

The correspondence relation information as to which region virtual object is associated with which stimulation generation unit (which region virtual object is disposed on which position and orientation of the stimulation generation unit) is previously recorded on the data recording unit 205. Thus, the CPU 201 can identify the stimulation generation unit corresponding to the region virtual object.

In step S4007 in FIG. 4, the CPU 201 outputs the operation setting information set in step S9002 to the stimulation generation unit with which the region virtual object corresponding to the ID information recorded on the RAM 202 in step S7002 is associated, via the stimulation information output unit 210.

Furthermore, in step S4007 in FIG. 4, the CPU 201 outputs the operation setting information set in step S9003 to the stimulation generation unit with which the region virtual object corresponding to the ID information recorded on the RAM 202 in step S7003 is associated, via the stimulation information output unit 210.

In the present exemplary embodiment, with respect to the stimulation control, it is useful to set the stimulation to be generated in the case of contact outside the attention range to a level higher than that generated in the case of contact inside the attention range.

That is, if the region virtual object contacting the background virtual object is included within the attention range, then the CPU 201 sets the operation setting information for causing the stimulation generation unit corresponding to the region virtual object to generate a stimulation of a first intensity.

On the other hand, if the region virtual object contacting the background virtual object is not included within the attention range, then the CPU 201 sets the operation setting information for causing the stimulation generation unit corresponding to the region virtual object to generate a stimulation of a second intensity. Here, the level of the first intensity is lower than that of the second intensity.

In the case where a vibration motor is used to operate the cutaneous sense stimulation unit 20 according to pulse width modulation (PWM) control, two duty ratios are previously set for outputting different vibration intensities.

Then, if the region virtual object contacting the background virtual object is included within the attention range, the CPU 201 sets a low duty ratio to the stimulation generation unit corresponding to the region virtual object as the operation setting information.

If the region virtual object contacting the background virtual object is not included within the attention range, then the CPU 201 sets a high duty ratio to the stimulation generation unit corresponding to the region virtual object as the operation setting information.

When the operation setting information set in this manner is output to the stimulation generation unit, if the region virtual object contacting the background virtual object is included within the attention range, the stimulation generation unit corresponding to the region virtual object generates a relatively low stimulation.

On the other hand, if the region virtual object contacting the background virtual object is not included within the attention range, the stimulation generation unit corresponding to the region virtual object generates a relatively high stimulation.

Accordingly, the user can recognize that the user has contacted the background virtual object based on the feel of the vibration stimulation. Thus, the user can clearly recognize the stimulation in the case of contact to which the user does not draw attention because the user receives a high stimulation in the case of contact outside the attention range.

In the present exemplary embodiment, the duty ratio is used as the operation setting information. However, the present invention is not limited to this.

That is, in the case of performing control of the vibration motor with an analog value of input voltage, the level of the stimulation to be output from the stimulation generation unit can be controlled by setting a low voltage value and a high voltage value as the operation setting information.

Furthermore, the degree (level) of the stimulation can be expressed and provided by changing the drive frequency or amplitude with respect to a device used as the cutaneous sense stimulation unit 20 according to the type thereof. Generally, in the case of applying a mechanical stimulation to the skin of a user, the user can most clearly feel a stimulation of about 200 Hz.

In this regard, the degree (level) of the stimulation can be changed by changing the frequency in a manner such that the high-intensity stimulation provided in the portion outside the attention range is set at around 200 Hz and the low-intensity stimulation provided in the portion within the attention range is set at 100 Hz or lower. In this case, the value at each frequency is used as the operation setting information.

Furthermore, as different stimulations to be provided according to the present exemplary embodiment, stimulations of different patterns can be used.

Figure 10A:
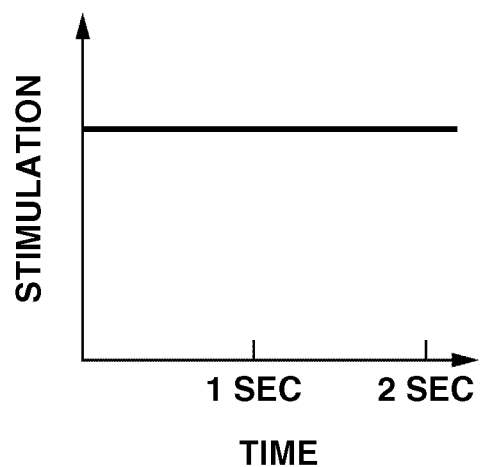
FIGS. 10A and 10B illustrate exemplary waveform charts corresponding to different stimulations.
Figure 10B:
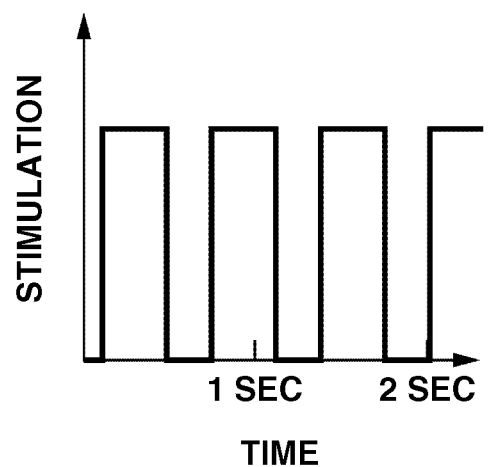

FIGS. 10A and 10B are waveform charts corresponding to respective different stimulations.

FIG. 10A is a chart illustrating continuous stimulation output. FIG. 10B is a chart illustrating an output in which the stimulation is provided in a rectangular wave.

The pattern of each stimulation can be assigned as the stimulation for the contact within the attention range and the stimulation for the contact outside the attention range. In this regard, it is useful to assign the stimulation pattern in FIG. 10A for the contact within the attention range and the stimulation pattern in FIG. 10B for the contact outside the attention range.

This is because the continuous contact within the attention range can be expressed by using the stimulation pattern in FIG. 10A and the stimulation for warning the user can be expressed by using the stimulation pattern in FIG. 10B.

That is, in the case where the stimulation generation unit is included within the attention range, the CPU 201 generates the operation setting information for causing the stimulation generation unit to generate a first stimulation. On the other hand, in the case where the stimulation generation unit is not included within the attention range, the CPU 201 generates the operation setting information for causing the stimulation generation unit to generate a second stimulation. The first stimulation and the second stimulation differ from each other.

In addition, it is also useful if the CPU 201 outputs a stimulation in only one of the case of the contact within the attention range and the contact outside the attention range and does not output a stimulation in the other case.

As described above, according to the present exemplary embodiment, different stimulations can be generated and provided between the contact within the attention range and the contact outside the attention range. Thus, the present exemplary embodiment can expressly provide contact information on a region of the body of a user even when the user does not draw attention to the contact outside the attention range.

In addition, according to the present exemplary embodiment having the above-described configuration, when the user receives a highly intense stimulation in the case of contact outside the attention range and thus draws attention to the stimulated region and changes the position and orientation of the viewpoint in the virtual space, the contacting region comes into the attention range. Thus, in this case, the level or amount of stimulation to be provided is changed to that in the case of the contact within the attention range.

Furthermore, according to the present exemplary embodiment having the above-described configuration, the type of the stimulation to be provided can be smoothly switched between the contact state stimulation for warning the user and the stimulation expressing conscious contact by dynamically changing the attention range based on the tracking information about the HMD 100. Here, the tracking of the HMD 100 refers to acquiring the position and orientation information about the head of a user or the position and orientation information about the display apparatus.

Second Exemplary Embodiment

A second exemplary embodiment of the present invention is described below. Various methods can be used for determining whether the region virtual object is located within the attention range. In the second exemplary embodiment of the present invention, the CPU 201 performs image processing on a real space image captured by the imaging unit 101 to determine whether the region virtual object is located within the attention range.

The system according to the present exemplary embodiment is similar to that in the first exemplary embodiment. The system according to the present exemplary embodiment is different from the first exemplary embodiment in the following points.

Figure 11:
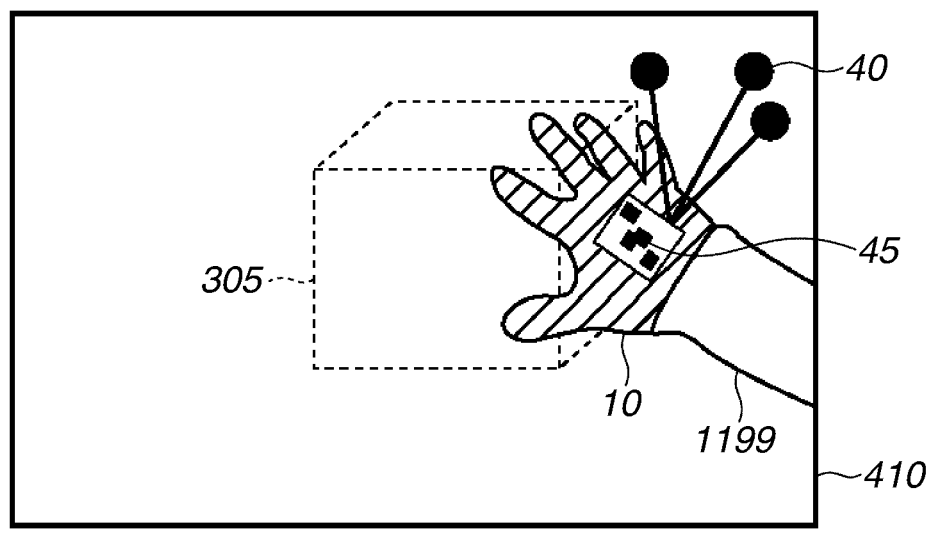
FIG. 11 illustrates an example of a real space image captured by an imaging unit illustrated in FIG. 2.

FIG. 11 illustrates an example of a real space image captured by the imaging unit 101 according to the present exemplary embodiment.

Referring to FIG. 11, a background virtual object 305, the arm 1199 of the user 1, and the stimulation generation unit 10 are included in the real space image 410. Furthermore, a two-dimensional bar code 45 and the marker 40 are disposed on the stimulation generation unit 10. The real space image 410 further includes the two-dimensional bar code 45 and the marker 40.

In the example illustrated in FIG. 11, the region virtual object corresponding to the stimulation generation unit 10 contacts the background virtual object 305. The two-dimensional bar code 45 indicates ID information (e.g., an ID) unique to the stimulation generation unit 10.

Here, any information other than the two-dimensional bar code 45 can be used as the ID information unique to the stimulation generation unit 10 if the information can indicate the ID information unique to the stimulation generation unit 10.

In the present exemplary embodiment, when the stimulation generation unit 10 is included in the real space image 410 (located within the real space image 410), the CPU 201 determines that the stimulation generation unit 10 is located within the attention range. More specifically, if the two-dimensional bar code 45 is detected in the real space image 410 and the two-dimensional bar code 45 is successfully recognized, then the CPU 201 determines that a stimulation generation unit 10 indicated by the two-dimensional bar code 45 and identified by the recognition is located within the attention range.

In the example illustrated in FIG. 11, when the two-dimensional bar code 45 is detected and recognized, the CPU 201 can determine that the two-dimensional bar code 45 indicating the stimulation generation unit 10 is located within the real space image 410. Thus, the CPU 201 sets the operation setting information for the contact within the attention range to the stimulation generation unit 10.

With respect to the range of image processing performed on the real space image 410 to detect the two-dimensional bar code 45, it is useful to perform the image processing for the entire real space image 410 or for a predetermined area only by masking an area not to be image-processed. The predetermined area can be selected according to the range of display by the display unit 102 or set so that pixels in the peripheral portion of the image are masked in consideration of the range of the central visual field.

In the example illustrated in FIG. 11, the marker 40 is provided on the stimulation generation unit 10 to acquire the position and orientation of the stimulation generation unit 10 outside the real space image 410. The marker 40 is provided on the stimulation generation unit 10 so as to acquire the position and orientation about the stimulation generation unit 10 outside the real space image 410 (outside the attention range) and to determine whether the corresponding region virtual object and the background virtual object contact each other.

In the present exemplary embodiment, an image that the user 1 actually observes is used to determine whether the region virtual object is located within the attention range. Accordingly, the result of the determination accords with the actual state.

For example, in the case where another real object is located between the stimulation generation unit 10 and the imaging unit 101 in FIG. 11, an image of the stimulation generation unit 10 is captured behind the real object. In this case, the two-dimensional bar code 45 is not recognized. Accordingly, the CPU 201 determines that the stimulation generation unit 10 indicated by the two-dimensional bar code 45 is not located within the attention range. In this case, the user cannot appropriately verify the position and orientation of the stimulation generation unit 10, which is located behind the real object. Accordingly, the CPU 201 determines that the stimulation generation unit 10 is located outside the attention range. Thus, the result of the determination can accord with the actual state.

Third Exemplary Embodiment

A third exemplary embodiment of the present invention is described below. In the case where the stimulation generation unit is located on a border between the attention range and the portion outside the attention range, it is useful to perform the following predetermined method as the processing for determining the presence of attention in step S4005 (FIG. 4).

For example, it is useful to use a method for determining that the user draws attention to contact (that the region virtual object contacting the background virtual object is located within the attention range) if any part of the stimulation generation unit is located within the attention range.

In addition, it is also useful to use a method for determining that the user draws attention to contact only if the entirety of the concerned stimulation generation unit is located within the attention range. In this case, if the stimulation generation unit is located on the border, the CPU 201 determines that the contact occurs outside the attention range. In addition, the CPU 201 can determine that a predetermined specific state has occurred if the stimulation generation unit is located on the border.

In the case of performing processing for determining whether the user draws attention to contact by setting an attention range in the virtual space as in the first exemplary embodiment, the CPU 201 determines that the stimulation generation unit is located on the border if the region virtual object is located across the border between the attention range and the outside of the attention range in the virtual space.

On the other hand, in the case of performing processing for determining whether the user draws attention to contact by performing image processing as in the second exemplary embodiment, the CPU 201 determines that the stimulation generation unit is located on the border if only a part of the marker 40 is recognized in the peripheral portion of an image.

Figure 12:
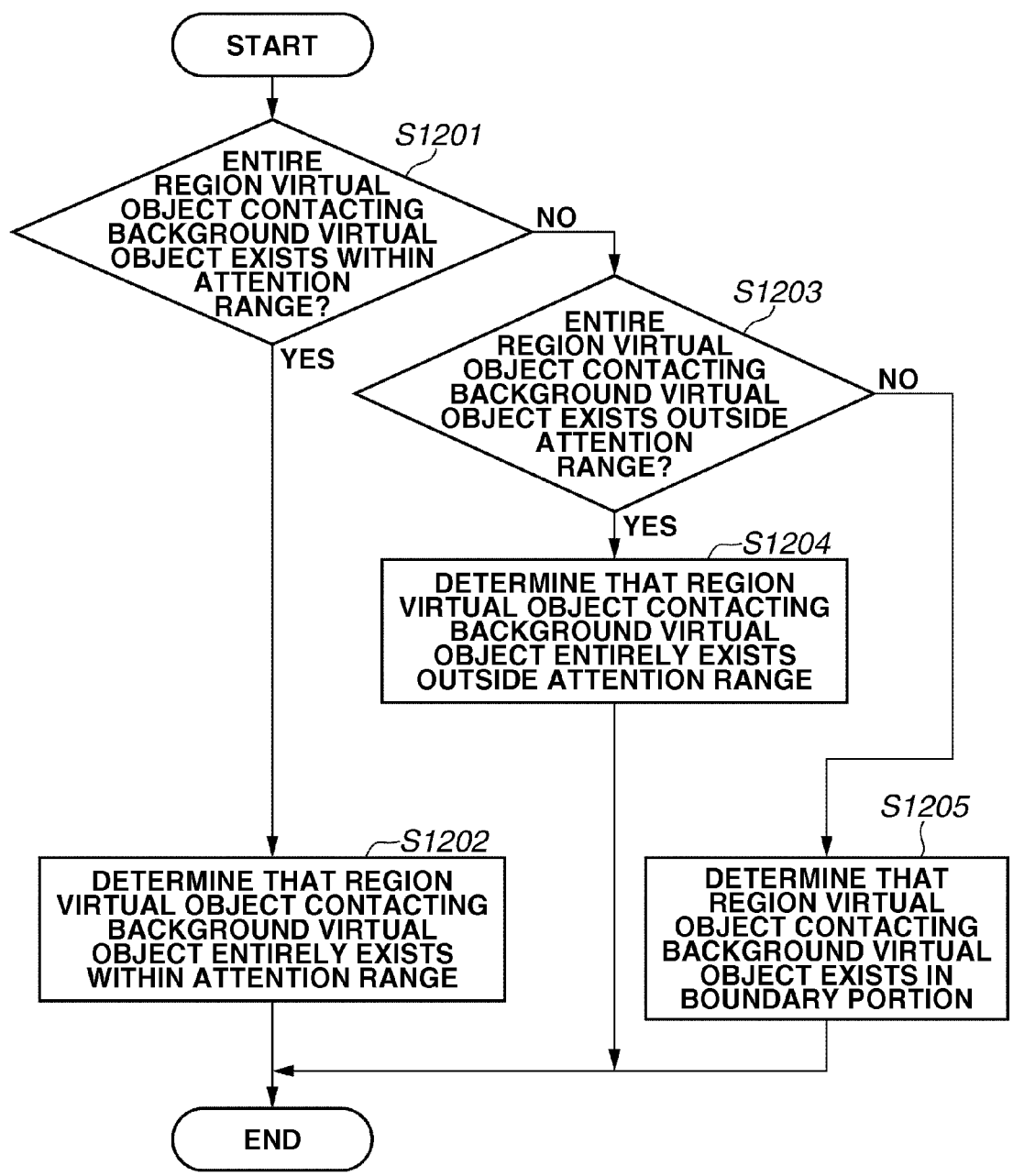
FIG. 12 is a flow chart illustrating an exemplary flow of processing for determining at which of an inside of an attention range, an outside of the attention range, and a peripheral portion thereof a region virtual object contacting a background virtual object is located.

FIG. 12 is a flow chart illustrating an example of a flow of processing for determining in which of the inside, the outside, or the border of the attention range the region virtual object contacting the background virtual object is located, according to the present exemplary embodiment.

Here, the processing according to the flow chart of FIG. 12 is performed in step S4005 (FIG. 4). In the processing described below, in the case of setting an attention range in the virtual space using the view volume 55, the CPU 201 determines in which of the inside, the outside, and the border of the attention range the region virtual object contacting the background virtual object is located.

Here, in step S4005, the CPU 201 does not process all of the region virtual objects but processes the region virtual object that has been determined to contact the background virtual object in the interference determination processing in step S4004.

Referring to FIG. 12, in step S1201, the CPU 201 determines whether the entire region virtual object is located within the attention range with respect to each region virtual object that has been determined to contact the background virtual object. The region virtual object determined to be located within the attention range for its entirety is processed in step S1202.

The region virtual object determined not to be located within the attention range for its entirety is processed in step S1203.

In step S1202, the CPU 201 records, on the RAM 202, the ID information (e.g., an ID) unique to the region virtual object determined to be located within the attention range for its entirety.

In step S1203, the CPU 201 determines whether the entire region virtual object, which has been determined not to be located within the attention range, is located outside the attention range. The region virtual object determined to be located outside the attention range for its entirety is then processed in step S1204.

On the other hand, the region virtual object determined not to be located outside the attention range for its entirety is then processed in step S1205.

In step S1204, the CPU 201 records, on the RAM 202, the ID information (e.g., an ID) unique to the region virtual object located outside the attention range for its entirety. In step S1205, the CPU 201 records, on the RAM 202, the ID information (e.g., an ID) unique to the region virtual object located in the border between the attention range and the portion outside the attention range (namely, the virtual object that has not been extracted as a result of the processing in step S1201 or step S1203.

Then, in step S4006 (FIG. 4), the CPU 201 sets the operation setting information for the above-described three cases.

In the case where the region virtual object whose entirety is located within the attention range exists or the region virtual object whose entirety is located outside the attention range exists, the CPU 201 sets the operation setting information in a manner similar to that in the first exemplary embodiment.

Furthermore, with respect to the stimulation generation unit corresponding to the region virtual object located on the border between the attention range and the portion outside the attention range, the CPU 201 sets the following operation setting information.

For example, the CPU 201 sets operation setting information indicating an intensity of a level between the intensity level of the stimulation generated by the stimulation generation unit corresponding to the region virtual object whose entirety is located outside the attention range and the intensity level of the stimulation generated by the stimulation generation unit corresponding to the region virtual object whose entirety is located within the attention range.

As described above, according to the present exemplary embodiment, the CPU 201 sets a higher level of stimulation compared to the stimulation for the attention range in the case of contact in the peripheral portion of the attention range. Accordingly, the present exemplary embodiment can provide a stimulation according to the degree of attention of the user.

Fourth Exemplary Embodiment

A fourth exemplary embodiment of the present invention is described below. In each of the above-described exemplary embodiments, the cutaneous sense stimulation unit is mounted on the stimulation generation unit to provide a cutaneous sense stimulation to the body of a user.

It is useful to provide an audio stimulation to the body of the user by mounting a sound generation unit that generates sound on the stimulation generation unit. In this case, a small-sized speaker can be used as the sound generation unit.

It is useful to use a cutaneous sense stimulation to notify the contact with the virtual object to the user. However, a device that provides a cutaneous sense stimulation may require a close contact with the skin of a user. Accordingly, the user may be required to perform a complicated operation for mounting and dismounting the stimulation generation unit.

On the other hand, the notification of the contact with sound is more advantageous and useful than the method using the cutaneous stimulation because it can be mounted and dismounted with a simple operation. Also in the case of using a sound generation unit instead of a cutaneous sense stimulation unit, the CPU 201 varies the volume or content of sound depending on the inside or outside of the attention range. Accordingly, the user can become easily aware of contact outside the attention range.

It is also useful to use an external speaker in the case of expressing the contact information with sound. In this case, it is more useful if a small-sized speaker is disposed at a position close to the contact position so that the contact position can be noticed by the user with sound.

It is further useful if the above-described methods using the vibration and the sound are used at the same time.

In the case of using sound information to notify the user of the contact, if different sound is generated during the work by the user or if a plurality of users cooperatively perform the work, a plurality of sounds may be generated and mixed. In this case, the users may not appropriately hear the notification sound. In this case, it is useful to use the cutaneous sense stimulation by priority. As described above, the stimulation generation unit to be used can be appropriately changed according to the state of the work by the user.

Fifth Exemplary Embodiment

A fifth exemplary embodiment of the present invention is described below. In each of the above-described exemplary embodiments, in step S4005 (FIG. 4), the CPU 201 does not process all of the region virtual objects but processes the region virtual object that has been determined to contact the background virtual object in the interference determination processing in step S4004.

In the present exemplary embodiment, the CPU 201 determines whether the region virtual object is located within the attention range before performing processing for determining whether the region virtual object interferes with the background virtual object.

Figure 13:
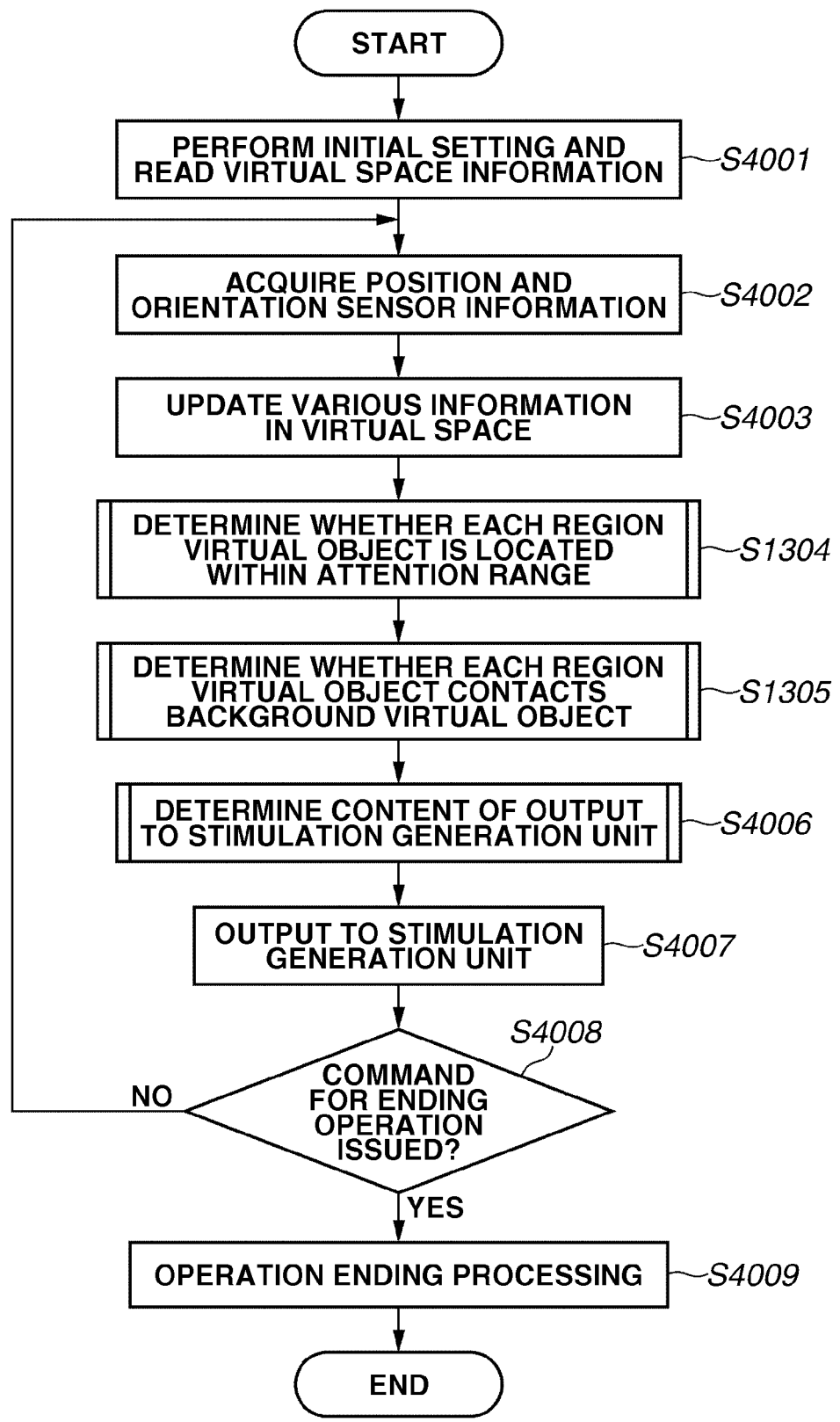
FIG. 13 is a flow chart illustrating an exemplary flow of processing for controlling an operation of each stimulation generation unit by a calculation processing apparatus (computer).

FIG. 13 is a flow chart illustrating an example of processing performed by the calculation processing apparatus 200 for controlling an operation of each of the stimulation generation units 10, 11, and 12 according to the present exemplary embodiment.

In the example illustrated in FIG. 13, steps that are similar to those in FIG. 4 are provided with the same numerals and symbols, and a description thereof is not repeated here.

In step S1304, the CPU 201 determining whether the region virtual object is located within the attention range with respect to all of the region virtual objects. In the present exemplary embodiment, the CPU 201 performs the above-described processing for determining whether the region virtual object is located within the attention range.

Then, in step S1305, the CPU 201 performs processing for determining whether the region virtual object contacts the background virtual object with respect to all of the region virtual objects.

In the present exemplary embodiment, the CPU 201 performs the processing for determining whether the region virtual object is located within the attention range before performing processing for determining whether the region virtual object interferes with the background virtual object, as described above. Accordingly, a result of the previous processing can be used in the subsequent processing.

For example, with respect to the region virtual object determined to be located within the attention range, the CPU 201 performs processing for determining the presence of interference with the background virtual object using detailed shape information.

On the other hand, with respect to the region virtual object determined to be located outside the attention range, the CPU 201 performs processing for determining the presence of interference with the background virtual object using simple shape information.

More specifically, in the case of the virtual space illustrated in FIG. 6, the CPU 201 performs processing for determining whether the region virtual object 311 interferes with the background virtual object using information about a shape similar to the hand of the user. Furthermore, the CPU 201 performs processing for determining whether the region virtual object 312 interferes with the background virtual object using information about a simple shape, such as a cylindrical column.

By controlling the processing for determining the presence of contact, the cost for calculating based on the determination of the presence of contact outside the attention range can be reduced.

Each of the region virtual object located within the attention range and the region virtual object located outside the attention range, of the region virtual objects contacting the background virtual object, is subjected to the processing similar to that in the above-described exemplary embodiments.

Sixth Exemplary Embodiment

A sixth exemplary embodiment of the present invention is described below. It is useful to set a relatively high stimulation as the stimulation to be generated at the time the region virtual object and the background virtual object contact each other outside the attention range compared to the stimulation to be generated at the time the region virtual object and the background virtual object contact each other within the attention range, as described above in the first exemplary embodiment.

That is, if the region virtual object contacting the background virtual object is included within the attention range, then the CPU 201 sets the operation setting information for causing the stimulation generation unit corresponding to the region virtual object to generate a stimulation of a first intensity.

On the other hand, if the region virtual object contacting the background virtual object is not included within the attention range, then the CPU 201 sets the operation setting information for causing the stimulation generation unit corresponding to the region virtual object to generate a stimulation of a second intensity. Here, the level of the first intensity is lower than that of the second intensity.

However, in the case where a high stimulation is continuously generated with respect to the contact outside the attention range, the high stimulation continues to be provided to the user even after the user has recognized the contact.

In this regard, for example, in the example illustrated in FIG. 1, if the user 1 performs a work or verification after having recognized the contact with the virtual object by the knee, then the user 1 may feel uncomfortable with the continuously provided stimulation if the user 1 is subjected to a continuous high stimulation on the knee. In this regard, in the present exemplary embodiment, the CPU 201 generates the stimulation to be generated at the time the region virtual object and the background virtual object contact each other outside the attention range, only for a predetermined time period from the start of the contact.

Figure 14:
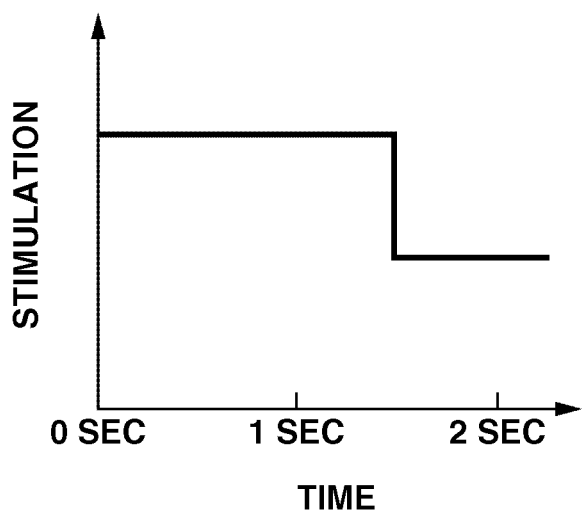
FIG. 14 is a chart illustrating, on the time series, exemplary intensity levels of stimulations generated in the case where contact between a region virtual object and a background virtual object is continued outside the attention range.

FIG. 14 is a chart illustrating, on the time series, exemplary intensity levels of stimulations generated in the case where the contact between a region virtual object and a background virtual object is continued outside the attention range, according to the present exemplary embodiment.

In the example illustrated in FIG. 14, the contact between the region virtual object and the background virtual object has occurred at the time of zero second.

Referring to FIG. 14, in the present exemplary embodiment, the CPU 201 lowers the degree of the stimulation intensity from a first degree to a second degree after a predetermined length of time has elapsed from the start of the contact (in FIG. 14, 1.5 seconds after). With this control, the present exemplary embodiment can achieve both an effect for causing the user to easily recognize the contact with the virtual object outside the attention range and an effect of suppressing the inconvenience of the user of being subjected to a high continued stimulation.

Here, it is useful if the first degree stimulation intensity is set higher than the stimulation intensity for the contact within the attention range.

That is, in the present exemplary embodiment, the operation setting information for causing the stimulation generation unit to generate the stimulation of the second intensity is the operation setting information for causing the stimulation generation unit to generate the second degree intensity stimulation only within a predetermined length of time.

Seventh Exemplary Embodiment

A seventh exemplary embodiment of the present invention is described below. In the above-described exemplary embodiments, the region virtual object is disposed according to the position and orientation of the stimulation generation unit for performing the processing for determining whether the stimulation generation unit and the background virtual object interfere with each other. Furthermore, the CPU 201 performs processing for determining whether the region virtual object interferes with the background virtual object. In the above-described exemplary embodiments, the CPU 201 uses the region virtual object to determine whether the stimulation generation unit is located within the attention range. As described above, the above-described exemplary embodiments use the region virtual object to reflect the actual state of the real space into the virtual space. Thus, the above-described exemplary embodiments can perform each determination processing described above.

However, such a method may not be so useful in terms of the costs for calculation. In this regard, in the present exemplary embodiment, the CPU 201 acquires the position of each cutaneous sense stimulation unit and reflects the acquired positional information in the virtual space.

For example, in the case where a cutaneous sense stimulation unit is mounted on each finger portion of the glove-like shaped stimulation generation unit, the CPU 201 reflects the position of each cutaneous sense stimulation unit in the virtual space as a point. Then, the CPU 201 uses the point as the region virtual object.

As described above, according to the present exemplary embodiment, the costs for calculation can be smaller than those in the above-described exemplary embodiments because the present exemplary embodiment does not use a large-volume region virtual object.

On the other hand, in the case where a large number of cutaneous sense stimulation units are used, it is difficult for the CPU 201 to acquire the position of each cutaneous sense stimulation unit in the real space. Accordingly, in this case, which of the configurations described in the above exemplary embodiments is to be used can be determined according to the purpose of use thereof.

Here, in the present exemplary embodiment, because the real space information to be reflected in the virtual space is expressed as a point having no volume, it is useful to acquire only the positional information about the cutaneous sense stimulation unit. That is, in this case, because it is not necessary to use the orientation information, a sensor having three degrees of freedom can be used instead of the position and orientation sensor.

Eighth Exemplary Embodiment

An eighth exemplary embodiment of the present invention is described below. In the above-described exemplary embodiments, the region virtual object has a shape similar to that of the stimulation generation unit in the real space. However, the shape is not limited to this.

For example, in the case of using a glove-like shaped stimulation generation unit, the shape of the region virtual object disposed according to the position and orientation of the stimulation generation unit can be a cylinder-like shape.

In addition, as the region virtual object disposed according to the position and orientation of the glove-like shaped stimulation generation unit, a virtual object having a shape like a hand holding a work tool can be used. In this case, the virtual object can be actually displayed as well as used in the processing for determining the presence of an interference with the background virtual object and the processing for determining whether the contact has occurred within the attention range. Accordingly, the user can perform a work and a verification using a virtual work tool.

Furthermore, in the above-described exemplary embodiments, the stimulation generation unit has a shape suitable for being mounted on a human body. However, the present invention is not limited to this.

That is, it is useful if a plurality of cutaneous sense stimulation units is disposed in a stick-like shaped stimulation generation unit. In this case, the CPU 201 sets a shape of a work tool such as a screwdriver or a wrench as the shape of the region virtual object to set the shape different from that of the actual stimulation generation unit and displays the same.

Accordingly, the user can virtually experience a work to be performed with a work tool. If a grip type stimulation generation unit is used, an intuitive operational feeling felt by the body of the user may be lost but the operation to wear such a grip type stimulation generation unit can be simplified.

In addition, the present exemplary embodiment having the above-described configuration can cause the user to effectively perform a simulation of an actual work in the virtual space.

Ninth Exemplary Embodiment

A ninth exemplary embodiment of the present invention is described below. In the above-described exemplary embodiments, the HMD 100 is used as an example of a head-mounted type display apparatus. However, it is useful to use a display apparatus other than the HMD 100 as a head-mounted type display apparatus. Furthermore, a display apparatus other than the head-mounted type display apparatus can be used.

That is, any display apparatus that is capable of identifying the line-of-sight direction by head tracking or capable of tracking the virtual line-of-sight direction by tracking the display apparatus itself can be used.

As an environment in which the head tracking method can be implemented, a system for performing a stereoscopic vision using a large-sized display and polarization glasses. In this case, the attention range can be set based on the position and orientation of the polarization glasses.

Tenth Exemplary Embodiment

A tenth exemplary embodiment of the present invention is described below. In the above-described exemplary embodiments of the present invention, the stimulation to be generated at the time the region virtual object and the background virtual object contact each other outside the attention range is set higher than the stimulation to be generated at the time the region virtual object and the background virtual object contact each other within the attention range.

However, in the case of using the cutaneous sense stimulation unit including a vibration motor, the intensity actually felt by the user may differ depending on the position of mounting of the cutaneous sense stimulation unit on the body of the user even when the stimulation of the same intensity is provided.

For example, the finger of a human can sensitively react to the stimulation but the knee or the elbow of a human cannot react to the stimulation as sensitive as the finger can do. Accordingly, in the case of mounting a cutaneous sense stimulation unit on different regions of the body of a user, it is useful if each region is previously caused to contact the virtual object and a value at which the user feels the intensity of the stimulation as the same is set as a reference intensity for each region.

Then, by setting different values for the stimulation intensity for each region for the contact within the attention range and the contact outside the attention range based on the reference intensity, the contact between the virtual object and any region of the whole body of the user can be clearly provided according to whether the contact has occurred within the attention range.

Here, the present exemplary embodiment uses the stimulation generation intensity is used for controlling the operation of the stimulation generation unit. However, the present invention is not limited to this. That is, a pattern of providing a stimulation or a frequency can be used as the method for controlling the operation of the stimulation generation unit.

Furthermore, the above-described exemplary embodiments can be used in combination with each other where appropriate.

Other Exemplary Embodiments

The present invention can also be achieved by providing a system or a device with a storage medium (or a recording medium) which stores program code of software implementing the functions of the embodiments and by reading and executing the program code stored in the storage medium with a computer of the system or the device (a CPU or an MPU).

In this case, the program code itself, which is read from the storage medium, implements the functions of the embodiments mentioned above, and accordingly, the storage medium storing the program code constitutes the present invention.

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, after the program code read from the storage medium is written in a memory provided in a function expansion board inserted in the computer or in a function expansion unit connected to the computer, a CPU and the like provided in the function expansion board or the function expansion unit can carry out a part of or the whole of the processing to implement the functions of the embodiments as described above.

In the case where the present invention is implemented on the above-described recording medium (storage medium), the recording medium stores the program code corresponding to the processing in the flow charts described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-234713 filed Sep. 10, 2007, which is hereby incorporated by reference herein in its entirety.

What is claimed is:

1. An information-processing apparatus comprising:
an acquisition unit configured to acquire positional information of a stimulation generation unit, the stimulation generation unit being arranged so as to be capable of applying stimulation to a body part of a user;
a first determination unit configured to determine whether the virtual object and the stimulation generation unit contact each other based on position and orientation information of the virtual object and the positional information of the stimulation generation unit;
a second determination unit configured to determine whether or not a position where the virtual object and the stimulation generation unit contact each other is located within a view volume representing a view range of the user in a case where it is determined that the virtual object and the stimulation generation unit contact each other; and
an output unit configured to generate a first stimulation by controlling an operation of the stimulation generation unit in a case where it is determined that the position is located within the view volume, and to generate a second stimulation which is stronger than the first stimulation by controlling the stimulation unit in a case where it is determined that the position is not located within the view volume.

2. The information-processing apparatus according to claim 1, further comprising:
a unit configured to acquire an image in a real space as viewed from the viewpoint; and
a unit configured to output a combined image generated by combining the image in the real space and the image in the virtual space to a display apparatus.

3. The information-processing apparatus according to claim 2, wherein the second determination unit is configured to determine whether the stimulation generation unit is included within or located outside the view volume by determining whether the stimulation generation unit is included within or located outside the image in the real space.

4. The information-processing apparatus according to claim 1, wherein the second determination unit includes:
a unit configured to acquire viewpoint information about the viewpoint including the position and orientation information about the viewpoint; and
a unit configured to generate information indicating the view volume based on the viewpoint information.

5. The information-processing apparatus according to claim 1, wherein, if it is determined by the second determination unit that the stimulation generation unit is included within the view volume, the output unit is configured to generate operation setting information for causing the stimulation generation unit to generate a first stimulation,
wherein, if it is determined by the second determination unit that the stimulation generation unit is located outside the view volume, the output unit is configured to generate operation setting information for causing the stimulation generation unit to generate a second stimulation, and
wherein the first stimulation and the second stimulation differ from each other.

6. The information-processing apparatus according to claim 5, wherein the operation setting information for causing the stimulation generation unit to generate the second stimulation includes operation setting information for causing the stimulation generation unit to generate the second stimulation only within a predetermined length of time.

7. An information-processing apparatus comprising:
a unit configured to acquire positional information of a stimulation generation unit, the stimulation generation unit being arranged so as to be capable of applying stimulation to a body part of a user;
a determination unit configured to determine whether a virtual object and the stimulation generation unit contact each other;
a unit configured to, according to a result of determination by the determination unit, control processing for determining whether a position where the virtual object and the stimulation generation unit contact each other is within a view volume representing a view range of the user based on position and orientation information of the virtual object and the positional information of the stimulation generation unit; and
an output unit configured to generate a first stimulation by controlling an operation of the stimulation generation unit in a case where it is determined that the position is located within the view volume, and to generate a second stimulation which is stronger than the first stimulation by controlling the stimulation unit in a case where it is determined that the position is not located within the view volume.

8. The information-processing apparatus according to claim 1, wherein the stimulation generated by the stimulation generation unit includes a cutaneous sense stimulation and a sound stimulation.

9. A method comprising:
acquiring positional information of a stimulation generation unit arranged so as to be capable of applying stimulation to a body part of a user;
determining whether a virtual object and the stimulation generation unit contact each other based on position and orientation information of the virtual object and the positional information of the stimulation generation unit;
determining whether or not a position where the virtual object and the stimulation generation unit contact each other is located within a view volume representing a view range of the user in a case where it is determined that the virtual object and the stimulation generation unit contact each other; and
generating a first stimulation by controlling an operation of the stimulation generation unit in a case where it is determined that the position is located within the view volume, and generating a second stimulation which is stronger than the first stimulation by controlling the stimulation generation unit in a case where it is determined that the position is not located within the view volume.

10. A method comprising:
acquiring positional information of a stimulation generation unit arranged so as to be capable of applying stimulation to a body part of a user;
determining whether or not the stimulation generation unit is located within a view volume representing a view range of the user;
according to a result of determination obtained at the determining step, controlling processing for determining whether a position where a virtual object and the stimulation generation unit contact each other is located within the view volume based on position and orientation information of the virtual object and the positional information of the stimulation generation unit; and
generating a first stimulation by controlling an operation of the stimulation generation unit in case where it is determined that the position is located within the view volume, and generating a second stimulation which is stronger than the first stimulation by controlling the stimulation generation unit in a case where it is determined that the position is not located within the view volume.

11. An information-processing apparatus configured to provide a virtual space including a virtual object to a user and to control a stimulation generation unit configured to apply stimulation to a body part of the user indicating contact between the user and the virtual object, the information-processing apparatus comprising:
a contact determination unit configured to determine a state of contact between the virtual object and the user;
an attention determination unit configured to determine whether a position where the virtual object and the user contact each other is located within a view volume representing a view range of the user, using positional information of the virtual object and viewpoint information of a viewpoint of the user; and
a control unit configured to control the stimulation generation unit to generate a first stimulation in a case where it is determined that the position is located within the view volume, and to generate a second stimulation stronger that the first stimulation in a case where it is determined that the position is not within the view volume.

12. A method for controlling an information-processing apparatus configured to provide a virtual space including a virtual object to a user and to control a stimulation generation unit configured to apply stimulation to a body part of the user indicating contact between the user and the virtual object, the method comprising:
determining a state of contact between the virtual object and the user;
determining whether a position where the virtual object and the user contact each other is located within a view volume representing a view range of the user, using positional information of the virtual object and viewpoint information a viewpoint of the user; and
controlling the stimulation generation unit to generate a first stimulation in a case where it is determined that the position is located within the view volume, and to generate a second stimulation stronger that the first stimulation in a case where it is determined that the position is not within the view volume.

13. A computer-readable medium storing a computer program for causing a computer to perform a method comprising:
acquiring positional information of a stimulation generation unit arranged so as to be capable of applying stimulation to a body part of a user;
determining whether a virtual object and the stimulation generation unit contact each other based on position and orientation information of the virtual object and the positional information of the stimulation generation unit;
determining whether a position where the virtual object and the stimulation generation unit contact each other is located within a view volume representing a view range of the user in a case where it is determined that the virtual object and the stimulation generation unit contact each other; and controlling an operation of the stimulation generation unit to generate a first stimulation in a case where it is determined that the position is located within the view volume, and to generate a second stimulation stronger that the first stimulation in a case where it is determined that the position is not within the view volume.

14. A computer-readable medium storing a computer program for causing a computer to perform a method comprising:

acquiring positional information of a stimulation generation unit arranged so as to be capable of applying stimulation to a body part of a user;

determining whether or not the stimulation generation unit is located within a view volume representing a view range of the user;

according to a result of determination by the determining step, controlling processing for determining whether a position where a virtual object and the stimulation generation unit contact each other is within the view volume based on position and orientation information of the virtual object and the positional information of the stimulation generation unit; and controlling an operation of the stimulation generation unit to generate a first stimulation in a case where it is determined that the position is located within the view volume, and to generate a second stimulation stronger that the first stimulation in a case where it is determined that the position is not within the view volume.

15. A computer-readable medium storing a computer program for causing a computer to perform a method comprising:

determining a state of contact between a virtual object and body part of a user;

determining whether a position where the virtual object contacts the body part of the user is located within a view volume representing a view range of the user, using positional information of the virtual object and viewpoint information of a viewpoint of the user; and controlling a stimulation generation unit to generate a first stimulation in a case where it is determined that the position is located within the view volume, and to generate a second stimulation stronger that the first stimulation in a case where it is determined that the position is not located within the view volume.

16. An information-processing apparatus configured to provide a virtual space including a virtual object to a user and to control a stimulation generation unit configured to generate a stimulation to a body part of the user indicating contact between the user and the virtual object, the information-processing apparatus comprising:

a contact determination means for determining a state of contact between the virtual object and the user;

an attention determination means for determining whether a position where the user contacts the virtual object is located within a view volume representing a view range of the user, using positional information of the virtual object and viewpoint information of a viewpoint of the user; and a control means for controlling the stimulation generation unit to generate a first stimulation in a case where it is determined that the position is located within the view volume, and to generate a second stimulation stronger that the first stimulation in a case where it is determined that the position is not within the view volume.

* * * * *